(12) United States Patent
Hui

(10) Patent No.: US 12,184,381 B2
(45) Date of Patent: Dec. 31, 2024

(54) DEVICE ORIENTATION ADJUSTMENT METHOD AND TERMINAL DEVICE

(71) Applicant: Huawei Technologies Co., Ltd., Shenzhen (CN)

(72) Inventor: Shaobo Hui, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/034,574

(22) PCT Filed: Oct. 21, 2021

(86) PCT No.: PCT/CN2021/125139
§ 371 (c)(1),
(2) Date: Apr. 28, 2023

(87) PCT Pub. No.: WO2022/089272
PCT Pub. Date: May 5, 2022

(65) Prior Publication Data
US 2024/0333362 A1    Oct. 3, 2024

(30) Foreign Application Priority Data
Nov. 2, 2020 (CN) .......................... 202011203638.7

(51) Int. Cl.
*H04B 7/06* (2006.01)
*H04W 72/044* (2023.01)

(52) U.S. Cl.
CPC ......... *H04B 7/0695* (2013.01); *H04B 7/0632* (2013.01); *H04W 72/046* (2013.01)

(58) Field of Classification Search
CPC .. H04B 7/0695; H04B 7/0632; H04W 72/046
See application file for complete search history.

(56) References Cited

U.S. PATENT DOCUMENTS

| 12,057,918 | B2* | 8/2024 | Svendsen | ............. H04B 7/0695 |
| 2021/0336682 | A1* | 10/2021 | Pezeshki | ................. H04B 7/063 |
| 2022/0271818 | A1* | 8/2022 | Svendsen | ............ H04W 64/006 |

* cited by examiner

*Primary Examiner* — Jean B Corrielus
(74) *Attorney, Agent, or Firm* — Slater Matsil, LLP

(57) ABSTRACT

In an embodiment a method includes performing, by a first terminal device, communication by using a first optimal receive beam of the first terminal device at a first location and an optimal transmit beam of a network device, when a signal quality of the first optimal receive beam and the optimal transmit beam does not meet a preset condition, determining, by the first terminal device, angle information obtained based on a reference direction and a first direction and outputting, by the first terminal device, orientation adjustment indication information based on the angle information or adjusting the first terminal device from the first location to a second location based on the angle information.

20 Claims, 13 Drawing Sheets

---

Perform communication by using a first optimal receive beam of a first terminal device at a first location and an optimal transmit beam of a network device — 610

When signal quality of communication performed by using the first optimal receive beam and the optimal transmit beam does not meet a preset condition, determine angle information obtained based on a reference direction and a first direction — 620

Output orientation adjustment indication information based on the angle information — 630

(a)          (b)

025139, filed Oct. 21, 2021,
DEVICE ORIENTATION ADJUSTMENT METHOD AND TERMINAL DEVICE

CROSS-REFERENCE TO RELATED APPLICATIONS

This patent application is a national phase filing under section 371 of PCT/CN2021/125139, filed Oct. 21, 2021, which claims the priority of Chinese patent application 202011203638.7, filed Nov. 2, 2020, each of which is incorporated herein by reference in its entirety.

TECHNICAL FIELD

This application relates to the field of terminals, and in particular, to a device orientation adjustment method and a terminal device.

BACKGROUND

In a process of communication between a terminal device and a network device, there is always a case in which signal quality of communication is poor. There are various factors that cause the poor signal quality, and an inappropriate location of a terminal device is an important factor that causes the poor signal quality.

In the current technology, when signal quality of communication is poor, basically, a user holds the terminal device and moves continuously until signal quality meets a requirement. This method for adjusting a device position is blind, but is still applicable to a 2G/3G/4G network.

A 5th generation (5th-Generation, 5G) mobile communication technology enables communication by using a millimeter wave. The millimeter wave can support high bandwidth and a low delay. However, the millimeter wave has disadvantages of weak coverage and poor penetration capability. In this case, if the user blindly moves the terminal device, signal quality is still not improved or even no signal is available after the user moves for a long time, which severely deteriorates user experience.

Therefore, a device orientation adjustment method needs to be provided, so that the position of the terminal device can be adjusted accurately and effectively, thereby improving signal quality of communication and improving user experience.

SUMMARY

Embodiments of this application provide a device orientation adjustment method. When signal quality of communication between a terminal device and a network device is poor, a direction (denoted as a first direction) of a target receive beam with good signal strength obtained when the terminal device is at a current location is determined, a direction of an optimal receive beam of the terminal device at the current location is used as a reference direction, angle information between the first direction and the reference direction is calculated, and a location of the terminal device is adjusted by using the angle information, so that an optimal receive beam of the adjusted terminal device is the target receive beam. In this way, the signal quality of communication can be accurately and effectively improved.

According to a first aspect, a device orientation adjustment method is provided, where the method is applied to a first terminal device, and the method includes:

performing communication by using a first optimal receive beam of the first terminal device at a first location and an optimal transmit beam of a network device;

when signal quality of communication performed by using the first optimal receive beam and the optimal transmit beam does not meet a preset condition, determining angle information obtained based on a reference direction and a first direction, where the reference direction is a direction that is of the first optimal receive beam and that is obtained when the first terminal device is at the first location, the first direction is a direction that is of a target receive beam and that is obtained when the first terminal device is at the first location, signal strength of the target receive beam in free space is greater than signal strength of the first optimal receive beam in free space, and the angle information is used to indicate at least one rotation angle and a rotation direction corresponding to each rotation angle; and outputting orientation adjustment indication information based on the angle information, where the orientation adjustment indication information is used to indicate a rotation operation for the first terminal device, so that the first terminal device can be adjusted from the first location to a second location, and a second optimal receive beam used by the first terminal device to perform communication with the optimal transmit beam at the second location is the target receive beam.

In this embodiment of this application, when signal quality of communication performed by using the first optimal receive beam and the optimal transmit beam of the network device by the first terminal device at the first location is poor, the direction that is of the target receive beam and that is obtained when the first terminal device is at the first location is determined, the direction that is of the first optimal receive beam and that is obtained when the first terminal device is at the first location is determined, the angle information is obtained based on the two directions, and a location of the first terminal device is adjusted by using the angle information, so that the second optimal receive beam that is used by the first terminal device that is adjusted to the second location to perform communication with the network device can be used as the target receive beam. In this way, the signal quality of communication can be accurately and effectively improved.

Optionally, the outputting orientation adjustment indication information based on the angle information includes:

controlling a display to display a first interface based on the angle information, where the first interface includes the orientation adjustment indication information generated in a graphical manner.

In this embodiment of this application, the first terminal device displays graphical orientation adjustment indication information by using the display, which is intuitive and easy to implement, and user experience is good.

Optionally, before the determining angle information obtained based on a reference direction and a first direction, the method further includes:

detecting an operation performed by a user on the display; and detecting, in response to the operation, signal quality of communication performed by using the first optimal receive beam and the optimal transmit beam.

In this embodiment of this application, the user may perform an operation on the display. After detecting the operation, the first terminal device detects the signal quality of communication between the first terminal device and the network device, which is intuitive and easy to implement, and user experience is good.

Optionally, the outputting orientation adjustment indication information based on the angle information includes:

transmitting the orientation adjustment indication information to a second terminal device based on the angle information.

In this embodiment of this application, the first terminal device transmits the orientation adjustment indication information to the second terminal device, so that the second terminal device can output the orientation adjustment indication information to the user for the user to adjust the device. In a case in which the first terminal device is not a handheld terminal, and the second terminal device is a handheld terminal that is often carried by the user, for example, a mobile phone, the user knows how to adjust the device at any time, and flexibility is higher.

Optionally, before the determining angle information obtained based on a reference direction and a first direction, the method further includes:

receiving request information transmitted by the second terminal device, where the request information is used to request signal quality; and detecting, based on the request information, signal quality of communication performed by using the first optimal receive beam and the optimal transmit beam.

In this embodiment of this application, the second terminal device transmits the request information for requesting the signal quality to the first terminal device. When the first terminal device is not a handheld terminal, and the second terminal device is a handheld terminal that is often carried by the user, for example, a mobile phone, it is convenient for the user to detect the signal quality at any time to adjust a location of the device in time, and flexibility is higher.

Optionally, the determining angle information obtained based on a reference direction and a first direction includes:

determining the angle information based on a beam map of the first terminal device, where the beam map is used to indicate spatial distribution of a plurality of receive beams of the first terminal device.

Optionally, the preset condition includes:

The signal quality is greater than or equal to a threshold.

Optionally, the target receive beam is a primary receive beam, and the primary receive beam is a beam with highest signal strength in free space in the plurality of receive beams of the first terminal device.

In this embodiment of this application, the primary receive beam is used as the target receive beam, and the device is adjusted based on the angle information obtained based on the direction of the primary receive beam and the direction of the first optimal receive beam that are obtained when the first terminal device is at the first location, so that the adjusted first terminal device can perform communication with the network device by using the primary receive beam, signal quality of communication between the first terminal device and the network device can be very good, and user experience is in a good status.

Optionally, when the first terminal device is at the second location, a direction of the target receive beam and the reference direction overlap.

According to a second aspect, a device orientation adjustment method is provided, where the method is applied to a first terminal device, and the method includes:

performing communication by using a first optimal receive beam of the first terminal device at a first location and an optimal transmit beam of a network device;

when signal quality of communication performed by using the first optimal receive beam and the optimal transmit beam does not meet a preset condition, determining angle information obtained based on a reference direction and a first direction, where the reference direction is a direction that is of the first optimal receive beam and that is obtained when the first terminal device is at the first location, the first direction is a direction that is of a target receive beam and that is obtained when the first terminal device is at the first location, signal strength of the target receive beam in free space is greater than signal strength of the first optimal receive beam in free space, and the angle information is used to indicate at least one rotation angle and a rotation direction corresponding to each rotation angle; and adjusting the first terminal device from the first location to a second location based on the angle information, where a second optimal receive beam used by the first terminal device to perform communication with the optimal transmit beam at the second location is the target receive beam.

In this embodiment of this application, when the signal quality of communication performed by using the first optimal receive beam and the optimal transmit beam of the network device by the first terminal device at the first location is poor, the direction that is of the target receive beam and that is obtained when the first terminal device is at the first location is determined, the direction that is of the first optimal receive beam and that is obtained when the first terminal device is at the first location is determined, the angle information is obtained based on the two directions, and the first terminal device adjusts the first terminal device to the second location by using the angle information, so that the second optimal receive beam used by the first terminal device to perform communication with the network device at the second location can be used as the target receive beam. In this way, the signal quality of communication can be accurately and effectively improved.

Optionally, before the determining angle information obtained based on a reference direction and a first direction, the method further includes:

detecting an input signal used to request signal quality, and detecting signal quality of communication performed by using the first optimal receive beam and the optimal transmit beam.

In this embodiment of this application, the detected input signal may trigger the first terminal device to detect the signal quality between the first terminal device and the network device, which is simple and easy to operate.

Optionally, the input signal is generated by an operation performed by a user on a display of the first terminal device.

In this embodiment of this application, the user may perform an operation on the display. After detecting the operation, the first terminal device detects the signal quality of communication between the first terminal device and the network device, which is intuitive and easy to implement, and user experience is good.

Optionally, the method further includes:

receiving the input signal transmitted by a second terminal device.

In this embodiment of this application, the second terminal device transmits the input signal for requesting the signal quality to the first terminal device. When the first terminal device is not a handheld terminal, and the second terminal device is a handheld terminal that is often carried by the user, for example, a mobile phone, it is convenient for the user to detect the signal quality at any time to adjust a location of the device in time, and flexibility is higher.

Optionally, the determining angle information obtained based on a reference direction and a first direction includes:
determining the angle information based on a beam map of the first terminal device, where the beam map is used to indicate spatial distribution of a plurality of receive beams of the first terminal device.

Optionally, the preset condition includes:
The signal quality is greater than or equal to a threshold.

Optionally, the target receive beam is a primary receive beam, and the primary receive beam is a beam with highest signal strength in free space in the plurality of receive beams of the first terminal device.

Optionally, when the first terminal device is at the second location, a direction of the target receive beam and the reference direction overlap.

According to a third aspect, a device orientation adjustment apparatus is provided, where the apparatus is disposed on a first terminal device or the apparatus is a first terminal device, and the apparatus includes:
a communications unit, configured to perform communication by using a first optimal receive beam of the first terminal device at a first location and an optimal transmit beam of a network device;
a processing unit, configured to: when signal quality of performing communication by using the first optimal receive beam and the optimal transmit beam does not meet a preset condition, determine angle information obtained based on a reference direction and a first direction, where the reference direction is a direction that is of the first optimal receive beam and that is obtained when the first terminal device is at the first location, the first direction is a direction that is of a target receive beam and that is obtained when the first terminal device is at the first location, signal strength of the target receive beam in free space is greater than signal strength of the first optimal receive beam in free space, and the angle information is used to indicate at least one rotation angle and a rotation direction corresponding to each rotation angle; and
an output unit, configured to output orientation adjustment indication information based on the angle information, where the orientation adjustment indication information is used to indicate a rotation operation for the first terminal device, so that the first terminal device can be adjusted from the first location to a second location, and a second optimal receive beam used by the first terminal device to perform communication with the optimal transmit beam at the second location is the target receive beam.

According to a fourth aspect, a device orientation adjustment apparatus is provided, where the apparatus is disposed on a first terminal device or the apparatus is a first terminal device, and the apparatus includes:
a communications unit, configured to perform communication by using a first optimal receive beam of the first terminal device at a first location and an optimal transmit beam of a network device;
a processing unit, configured to: when signal quality of performing communication by using the first optimal receive beam and the optimal transmit beam does not meet a preset condition, determine angle information obtained based on a reference direction and a first direction, where the reference direction is a direction that is of the first optimal receive beam and that is obtained when the first terminal device is at the first location, the first direction is a direction that is of a target receive beam and that is obtained when the first terminal device is at the first location, signal strength of the target receive beam in free space is greater than signal strength of the first optimal receive beam in free space, and the angle information is used to indicate at least one rotation angle and a rotation direction corresponding to each rotation angle; and
the processing unit is further configured to adjust the first terminal device from the first location to a second location based on the angle information, where a second optimal receive beam used by the first terminal device to perform communication with the optimal transmit beam at the second location is the target receive beam.

According to a third aspect, a terminal device is provided, including one or more processors, a memory, and one or more computer programs, where the one or more computer programs are stored in the memory, and the one or more computer programs include instructions. When the instructions are executed by the terminal device, the terminal device is enabled to perform the method in any possible implementation of the first aspect.

According to a sixth aspect, a terminal device is provided, including one or more processors, a memory, and one or more computer programs, where the one or more computer programs are stored in the memory, and the one or more computer programs include instructions. When the instructions are executed by the terminal device, the terminal device is enabled to perform the method in any possible implementation of the second aspect.

According to a seventh aspect, a computer program product including instructions is provided, and when the computer program product is run on a first terminal device, the first terminal device is enabled to perform the method according to the first aspect or the second aspect.

According to an eighth aspect, a computer-readable storage medium is provided, including instructions, and when the instructions are run on a first terminal device, the first terminal device is enabled to perform the method according to the first aspect or the second aspect.

According to a ninth aspect, a chip is provided, and is configured to execute instructions. When the chip runs, the chip performs the method according to the first aspect or the second aspect.

DETAILED DESCRIPTION OF ILLUSTRATIVE EMBODIMENTS

The following describes technical solutions of this application with reference to accompanying drawings.

Figure 1:
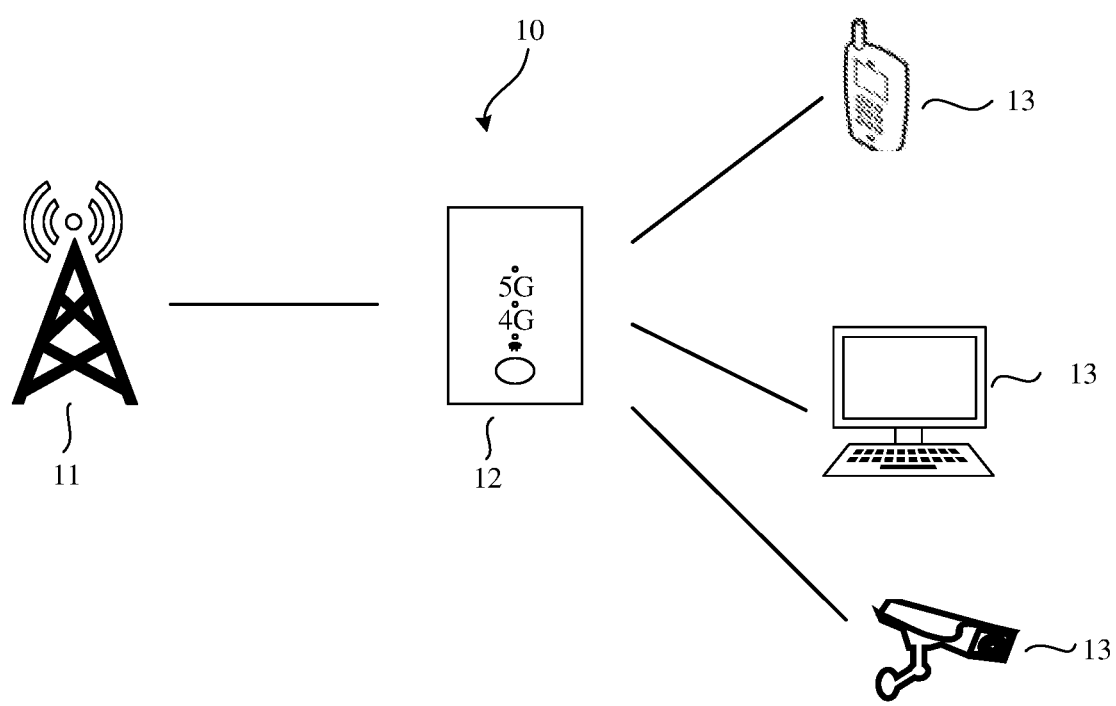
FIG. 1 is a schematic diagram of an architecture of a communications system according to an embodiment of this application.

FIG. 1 is a schematic diagram of an architecture of a communications system applicable to an embodiment of this application according to an embodiment of this application.

As shown in FIG. 1, the communications system 10 may include at least one network device 11, at least one customer premises equipment (customer premise equipment, CPE) 12, and at least one user equipment (user equipment, UE) 13. FIG. 1 is only a schematic diagram. The communications system 10 may further include another network device, for example, may further include a wireless relay device and a wireless backhaul device, which are not shown in FIG. 1. A quantity and a specific type of network devices and UE included in the mobile communications system are not limited in this embodiment of this application.

The UE 13 in this embodiment of this application may be a mobile phone, a tablet computer, a notebook computer, a smart band, a smartwatch, a smart helmet, smart glasses, or the like. Alternatively, the UE 13 may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a terminal device in a 5G network, a terminal device in a future evolved public land mobile network (public land mobile network, PLMN), or the like. This is not limited in this embodiment of this application. A technical solution provided in this application is applicable to UE 103 that uses one or more of the following communication technologies: a Bluetooth (Bluetooth, BT) communication technology, a global positioning system (global positioning system, GPS) communication technology, a wireless fidelity (wireless fidelity, Wi-Fi) communication technology, a global system for mobile communication (global system for mobile communications, GSM) communication technology, a wideband code division multiple access (wideband code division multiple access, WCDMA) communication technology, a long term evolution (long term evolution, LTE) communication technology, a 5G communication technology, and other future communication technologies.

The network device 11 in this embodiment of this application may be a device configured to perform communication with the UE 13. The network device may be a network device (base transceiver station, BTS) in a GSM system or code division multiple access (code division multiple access, CDMA), or may be a network device (NodeB, NB) in a WCDMA system, or may be an evolved NodeB (evolved NodeB, eNB, or eNodeB) in an LTE system. Alternatively, the network device may be a relay station, an access point, a vehicle-mounted device, a wearable device, a network device (new generation NodeB, gNB or gNodeB) in a future 5G network, a network device in a future evolved PLMN network, a subsequent network device supporting a 3rd generation partnership project (3rd generation partnership project, 3GPP) protocol version, or the like. This is not limited in this embodiment of this application.

The CPE 12 is a mobile signal access device that receives a mobile signal and forwards the mobile signal by using a wireless Wi-Fi signal. For example, the CPE 12 may convert a 2G/3G/4G/5G signal transmitted by the network device 11 into a Wi-Fi signal, so that the UE 13 is connected to a network. The CPE 12 may support a plurality of user equipments that access the Internet simultaneously. As shown in FIG. 1, the CPE 12 may be connected to three UEs 13. The CPE 12 may be widely applied to wireless network access in rural areas, towns, hospitals, companies, factories, and residential communities, to save costs of deploying wired networks.

Figure 2:
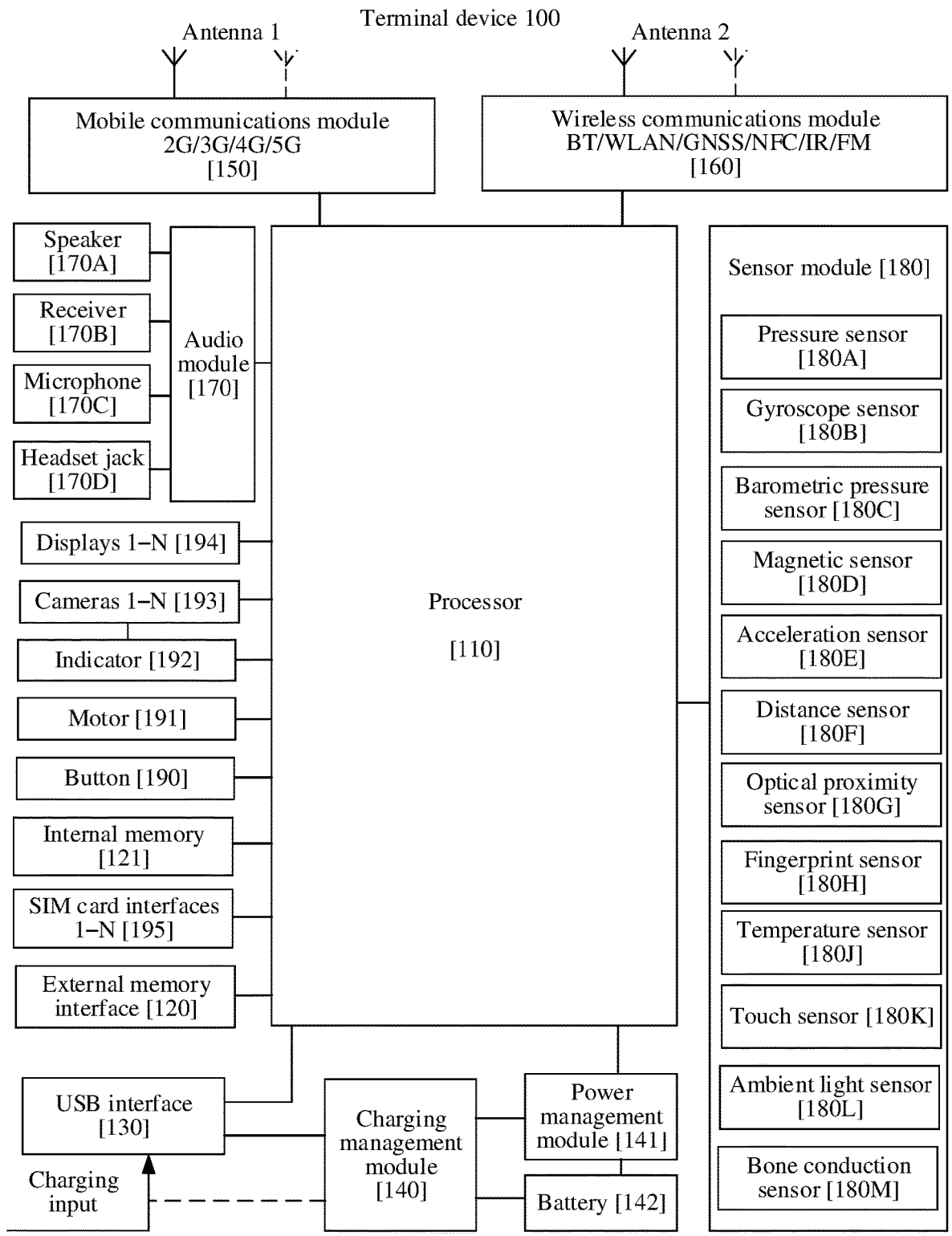
FIG. 2 is a schematic diagram of a structure of a terminal device according to an embodiment of this application.

FIG. 2 is a schematic diagram of a structure of a terminal device according to an embodiment of this application. The terminal device 100 shown in FIG. 2 may be any electronic device that can communicate with the network device 11 shown in FIG. 1. For example, the terminal device 100 may be the CPE 12 or the user equipment 13 in FIG. 1.

Refer to FIG. 2. The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, a sensor module 180, a button 190, an indicator 192, a display 194, a subscriber identity module (subscriber identity module, SIM) card interface 195, and the like. For example, the sensor module 180 may include a gyroscope sensor 180B, an acceleration sensor 180E, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal device 100. The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and therefore improves system efficiency.

The processor 110 in this embodiment of this application may detect signal quality of communication between the terminal device 100 and the network device. When the signal quality does not meet a preset condition, in an example, the processor 100 may output an orientation adjustment indication used to adjust the terminal device 100, so that a user can adjust the terminal device 100 from a current location to another location, to improve the signal quality of communication of the terminal device 100; and in another example, the processor 100 may control the terminal device 100 to adjust from a current location to another location, to improve the signal quality of communication of the terminal device 100. If the terminal device 100 is CPE, the processor 110 may further convert a received mobile signal into a wireless Wi-Fi signal, so as to implement communication between the terminal device 100 and the network device by using the CPE.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be coupled to a charger, a flash, a camera 193, and the like by using different I2C bus interfaces. For example, the processor 110 may be coupled to the touch sensor 180K through an I2C interface, so that the processor 110 communicates with the touch sensor 180K through the I2C bus interface to implement a touch function of the terminal device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement an image shooting function of the terminal device 100. The processor 110 communicates with the display 194 through the DSI interface, to implement a display function of the terminal device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the terminal device 100, or may be configured to transmit data between the terminal device 100 and a peripheral device, or may be configured to connect to the headset and play audio through the headset. This interface can alternatively be configured to connect to another electronic device, such as an AR device.

It can be understood that an interface connection relationship between the modules illustrated in this embodiment of this application is only an example for description, and does not constitute a limitation on the structure of the terminal device 100. In some other embodiments of this application, the terminal device 100 may alternatively use different interface connection manners in the foregoing embodiment or a combination of a plurality of interface connection manners.

The charging management module 140 is configured to receive charging input from the charger. The charger may be a wireless charger or a wired charger. In some embodiments of wired charging, the charging management module 140 may receive charging input from the wired charger through the USB interface 130. In some embodiments of wireless charging, the charging management module 140 may receive wireless charging input by using a wireless charging coil of the terminal device 100. When charging the battery 142, the charging management module 140 may further supply power to the terminal device by using the power management module 141.

The power management module 141 is configured to connect the battery 142, the charging management module 140, and the processor 110. The power management module 141 receives an input of the battery 142 and/or the charging management module 140, and supplies power to the processor 110, the internal memory 121, the external memory, the wireless communications module 160, and the like. The power management module 141 may be further configured to monitor parameters such as a battery capacity, a battery cycle times, and a battery health status (leakage, impedance). In some other embodiments, the power management module 141 may alternatively be disposed in the processor 110. In some other embodiments, the power management module 141 and the charging management module 140 may also be disposed in a same device.

A wireless communication function of the terminal device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal device 100 may be configured to cover one or more communication frequency bands. Different antennas may be further multiplexed, to increase antenna utilization. For example, the antenna 1 may be multiplexed as a diversity antenna of a wireless local area network. In some other embodiments, the antennas may be used in combination with a tuning switch.

The mobile communications module 150 may provide a wireless communication solution that includes 2G/3G/4G/5G or the like and that is applied to the terminal device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules in the mobile communications module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low frequency baseband signal obtained through demodulation to the baseband processor for processing. After being processed by the baseband processor, the low frequency baseband signal is transmitted to the application processor. In some embodiments, the modem processor may be an independent component. In some other embodiments, the modem processor may be independent of the processor 110, and is disposed in a same component as the mobile communications module 150 or another function module.

The wireless communications module 160 may provide a solution that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication technology (near field communication, NFC), and an infrared (infrared, IR) technology and that is applied to the terminal device 100. The wireless communications module 160 may be one or more components integrating at least one communication processing module. The wireless communications module 160 receives an electromagnetic wave through the antenna 2, performs frequency modulation and filtering processing on an electromagnetic wave signal, and transmits a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the terminal device 100 is coupled to the mobile communications module 150, and the antenna 2 is coupled to the wireless communications module 160, so that the terminal device 100 can communicate with a network and another device by using a wireless communication technology. The wireless communication technology may include a global system for mobile communication (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The external memory interface 120 may be configured to connect to an external memory card, for example, a micro SD card, to extend a storage capability of the terminal device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications and data processing of the terminal device 100. The internal memory 121 may include a program storage area and a data storage area. The program storage area may store an operating system, an application required by at least one function (for example, a voice play function and an image play function), and the like. The data storage area may store data (for example, audio data or a phone book) created in a process of using the terminal device 100. In addition, the internal memory 121 may include a high-speed random access memory, and may further include a nonvolatile memory, for example, at least one magnetic disk storage device, a flash storage device, a universal flash storage (universal flash storage, UFS), and the like.

The gyroscope sensor 180B may be configured to determine a motion posture of the terminal device 100. In some embodiments, angular velocities of the terminal device 100 around three axes (namely, x, y, and z axes) may be determined by using the gyroscope sensor 180B. The gyroscope sensor 180B may be configured to implement image stabilization during photographing. For example, when a shutter is pressed, the gyroscope sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyroscope sensor 180B may also be used in a navigation scenario and a somatic game scenario.

The acceleration sensor 180E may detect accelerations in various directions (usually on three axes) of the terminal device 100. A magnitude and a direction of gravity may be detected when the terminal device 100 is stationary. The acceleration sensor 180E may be further configured to identify a posture of the terminal device, and is used in an application such as switching between a landscape mode and a portrait mode or a pedometer.

The button 190 may include a power button. The button 190 may be a mechanical button, or may be a touch button. The terminal device 100 may receive a button input, and generate a button signal input related to a user setting and function control of the terminal device 100.

The indicator 192 may be an indicator, and may be configured to indicate a charging status and a power change, or may be configured to indicate a message, or the like. If the terminal device 100 is the CPE, the indicator 192 may further indicate a network used by the terminal device 100. For example, the indicator 192 may indicate the terminal device 100 to use a 4G, 5G, or wireless Wi-Fi network.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the terminal device 100 may include one or N displays 194, where N is a positive integer greater than 1.

In an embodiment in which the terminal device 100 includes the display 194, in an example, the processor 110 may detect an operation performed by a user on the terminal device 100, and detect, based on the operation, signal quality of communication between the terminal device 100 and the network device, to determine whether a position of the terminal device 100 needs to be adjusted. In another example, the processor 110 may further control the display 194 to display a graphical orientation adjustment instruction, and the user may adjust the position of the terminal device 100 based on the graphical orientation adjustment instruction.

The SIM card interface 195 is configured to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible to different types of SIM cards. The SIM card interface 195 may also be compatible with an external storage card. The terminal device 100 interacts with a network through the SIM card, to implement functions such as calling and data communication. In some embodiments, the terminal device 100 uses an eSIM, namely, an embedded SIM card. The eSIM card may be embedded in the terminal device 100, and cannot be separated from the terminal device 100.

In some other embodiments, in addition to the foregoing listed components, still refer to FIG. 2. The terminal device 100 may further include at least one of the following components: an audio module 170, a speaker 170A, a microphone 170C, a receiver 170B, a headset interface 170D, a motor 191, a camera 193, and the sensor module 180 may further include a pressure sensor 180A, a barometric pressure sensor 180C, a magnetic sensor 180D, a distance sensor 180F, an optical proximity sensor 180G, a fingerprint sensor 180H, a temperature sensor 180J, a touch sensor 180K, an ambient light sensor 180L, a bone conduction sensor 180M, and the like.

The audio module 170 is configured to convert digital audio information into an analog audio signal for output, and is also configured to convert analog audio input into a digital audio signal. The audio module 170 may be configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The terminal device 100 may be used to listen to music or answer a hands-free call through the speaker 170A.

In an embodiment in which the terminal device 100 includes the speaker 170A, for example, the processor 110 may control the speaker 170A to output a sound signal of an orientation adjustment instruction, and a user may adjust the location of the terminal device 100 based on the sound signal.

The microphone 170C, also referred to as a "microphone", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal device 100. In some other embodiments, two microphones 170C may be disposed in the terminal device 100, to collect a sound signal and further implement a noise reduction function. In some other embodiments, three, four, or more microphones 170C may alternatively be disposed in the terminal device 100, to collect a sound signal, implement noise reduction, and identify a sound source, to implement a directional recording function and the like.

In the embodiment in which the terminal device 100 includes the microphone 170C, for example, the microphone 170C may pick up an instruction transmitted by a user, and the processor 110 may detect, based on the instruction, signal quality of communication between the terminal device 100 and the network device, to determine whether a location of the terminal device 100 needs to be adjusted.

The receiver 170B, also referred to as an "earpiece", is configured to convert an audio electrical signal into a sound signal. When a call is answered or voice information is received through the terminal device 100, the receiver 170B may be put close to a human ear to listen to a voice.

The headset interface 170D is configured to connect to a wired headset. The headset interface 170D may be the USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device 100 determines pressure intensity based on a capacitance change. When a touch operation is performed on the display 194, the electronic device 100 detects intensity of the touch operation through the pressure sensor 180A. The terminal device 100 may further calculate a touch location based on a detection signal of the pressure sensor 180A. In some embodiments, touch operations that are performed on a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is performed.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip leather case by using the magnetic sensor 180D. In some embodiments, when the terminal device 100 is a flip phone, the terminal device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The distance sensor 180F is configured to measure a distance. The terminal device 100 may measure a distance by using infrared light or a laser. In some embodiments, in a shooting scenario, the terminal device 100 may measure a distance by using the distance sensor 180F, to implement quick focusing.

The optical proximity sensor 180G may include, for example, a light emitting diode (LED) and an optical detector, for example, a photodiode. The light-emitting diode may be an infrared light-emitting diode. The terminal device 100 emits infrared light outward by using the light-emitting diode. The terminal device 100 detects infrared reflected light from a nearby object by using the photodiode. When sufficient reflected light is detected, the terminal device 100 may determine that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The terminal device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal device 100 is in a pocket, to prevent accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 reduces performance of a processor located near the temperature sensor 180J, to reduce power consumption and implement heat protection. In some other embodiments, when the temperature is lower than another threshold, the terminal device 100 heats the battery 142, to avoid abnormal shutdown of the terminal device 100 caused by a low temperature. In some other embodiments, when the temperature is lower than still another threshold, the terminal device 100 boosts an output voltage of the battery 142, to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may alternatively be disposed on a surface of the terminal device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The motor 191 may generate a vibration prompt. The motor 191 may be configured to provide an incoming call vibration prompt or a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The camera 193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the terminal device 100 may include one or N cameras 193, where N is a positive integer greater than 1.

It should be understood that, a structure illustrated in this embodiment of this application does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

For example, if the terminal device 100 is a CPE, the terminal device 100 may include a processor 110, an external memory interface 120, an internal memory 121, a USB interface 130, a charging management module 140, an antenna 1, an antenna 2, a mobile communications module 150, a wireless communications module 160, a sensor module 180, a button 190, an indicator 192, and a subscriber identity module (subscriber identification module, SIM) card interface 195. Optionally, the terminal device 100 may further include a display 194, an audio module 170, a speaker 170A, a microphone 170C, and the like.

As described in the background, if a location of the terminal device is inappropriate, signal quality of communication is poor, affecting user experience. To resolve this problem, an embodiment of this application provides a device orientation adjustment method. Based on existing beamforming and beam pairing, a position of a terminal device is adjusted mainly by using a beam of the terminal device, thereby accurately and effectively improving signal quality of communication.

First, for ease of description, some technical terms in embodiments of this application are described.

A transmit beam is a beam used by the network device to transmit a signal, and is not only used to receive a signal transmitted by the terminal device, but also used to transmit a signal to the terminal device. In other words, the network device transmits and receives a signal by using the transmit beam. In some embodiments, the network device may support a large-scale antenna array. Based on a beamforming technology, the network device may form a plurality of transmit beams. Directions of the plurality of transmit beams are different, and signal strength of the plurality of transmit beams in free space is different. For example, signal strength of the plurality of transmit beams may not be completely the same, and beams with same signal strength may exist in the plurality of transmit beams. For another example, signal strength of the plurality of transmit beams is completely different. The signal strength of the transmit beam in free space is mainly related to a feature of an antenna disposed in the network device. For example, an antenna inherently has a main lobe and a side lobe when transmitting a signal. The main lobe and the side lobe are represented by using an antenna pattern. Signal strength of the main lobe is greater than signal strength of the side lobe. Both the main lobe and the side lobe of the antenna of the network device may be understood as transmit beams. For a network device provided with an omnidirectional antenna, the omnidirectional antenna may have a plurality of main lobes.

A primary transmit beam is a beam with good signal strength of a plurality of transmit beams in free space in the plurality of transmit beams of the network device. With reference to a main lobe and a side lobe in an antenna pattern, the primary transmit beam may be understood as a main lobe of an antenna of the network device. In some embodiments, the network device communicates with the terminal device by using the primary transmit beam. In an embodiment in which an omnidirectional antenna is disposed on the network device, the network device may have a plurality of primary transmit beams.

An optimal transmit beam represents a transmit beam with best signal quality when the network device communicates with the terminal device at a current location, and the network device transmits a signal at the current location by using the optimal transmit beam. It should be understood that an optimal transmit beam is not only related to a feature of an antenna, but also related to a location of the network device. The network device may have different optimal receive beams at different locations. In an implementation process, the network device initiates beam measurement for a transmit beam of the network device to the terminal device, the terminal device measures signal quality of each transmit beam, and transmits the signal quality to the network device, and the network device selects a transmit beam with best signal quality from a plurality of transmit beams as the optimal transmit beam. In some embodiments, the optimal transmit beam determined by the network device may be a primary transmit beam. Certainly, the optimal transmit beam may not be the primary transmit beam.

A receive beam is a beam used by the terminal device to transmit a signal, and is not only used to receive a signal transmitted by the network device, but also used to transmit a signal to the network device. In other words, the terminal device transmits and receives a signal by using the receive beam. In some embodiments, similar to the network device, the terminal device may also support a large-scale antenna array, and the terminal device may form a plurality of receive beams based on a beamforming technology. Directions of the plurality of receive beams are different, and signal strength of the plurality of receive beams in free space is different. For example, signal strength of the plurality of receive beams may not be completely the same, and beams with same signal strength may exist in the plurality of receive beams. For another example, signal strength of the plurality of receive beams is completely different. It should be understood that the signal strength of the receive beam in free space is mainly related to a feature of an antenna disposed on the terminal device. For example, an antenna inherently has a main lobe and a side lobe when transmitting a signal. The main lobe and the side lobe are represented by using an antenna pattern. Signal strength of the main lobe is greater than signal strength of the side lobe. Both the main lobe and the side lobe of the terminal device may be understood as receive beams. Generally, an antenna of the terminal device is a directional antenna, and the directional antenna includes a main lobe.

A primary receive beam is a beam with best signal strength of a plurality of receive beams in free space in the plurality of receive beams of the terminal device. With reference to a main lobe and a side lobe in an antenna pattern, the primary receive beam may be understood as a main lobe of an antenna of the terminal device. In some embodiments, the terminal device performs communication with the network device by using the primary receive beam. In an embodiment in which a directional antenna is disposed on the terminal device, the terminal device has one primary transmit beam.

An optimal receive beam represents a receive beam with best signal quality in communication between the terminal device and the network device at a current location, and the terminal device transmits a signal at the current location by using the optimal receive beam. It should be understood that an optimal receive beam is not only related to a feature of an antenna, but also related to a location of the terminal device. For a same optimal transmit beam, the terminal device may have different optimal receive beams at different locations. In an implementation process, after determining the optimal transmit beam, the network device initiates beam measurement for a receive beam of the terminal device to the terminal device based on the optimal transmit beam, the terminal device measures signal quality of each receive beam, and transmits the signal quality to the network device, and the network device selects a receive beam with best signal quality from a plurality of receive beams as the optimal receive beam. In some embodiments, if the terminal device is placed at an appropriate location, the optimal receive beam of the terminal device is the primary receive beam. In this way, signal quality of communication can reach an optimal status. Certainly, the optimal receive beam may not be the primary receive beam.

A target receive beam, where if signal quality of an optimal receive beam used by the terminal device at a location is poor, and signal strength of at least one of a plurality of receive beams in free space is greater than signal strength of the optimal receive beam, the target receive beam is a beam whose signal strength is greater than that of the optimal receive beam in free space. Optionally, the target receive beam may be a primary receive beam.

Figure 3:
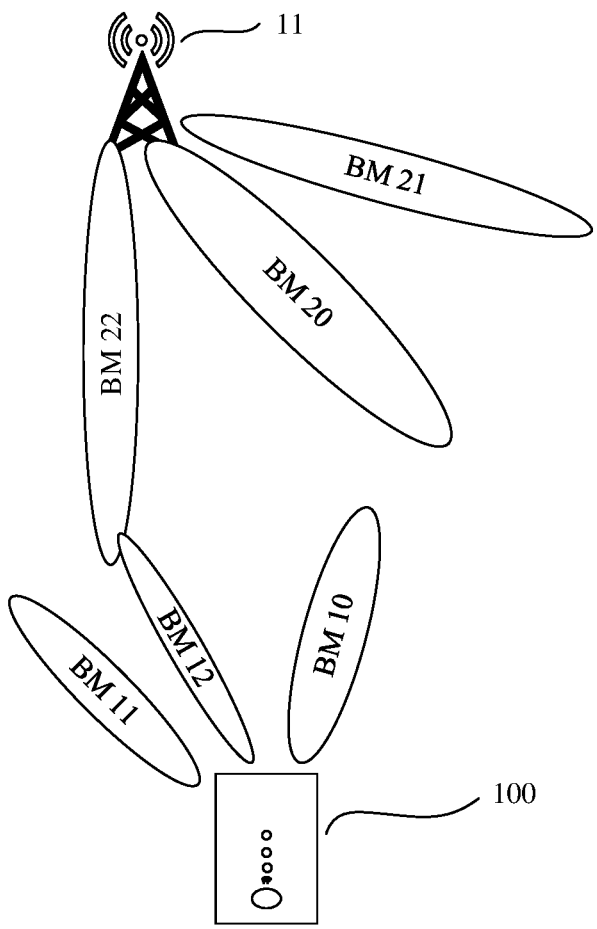
FIG. 3 is a schematic scenario diagram of a plurality of beams formed by a network device and a terminal device according to an embodiment of this application.

FIG. 3 is a schematic scenario diagram of a plurality of beams formed by a network device and a terminal device according to an embodiment of this application. For ease of description, the network device 11 and the electronic device 100 are described by using an example in which a CPE is the electronic device 100. It should be understood that the scenario diagram shown in FIG. 3 is only an example for description. The network device 11 and the terminal device 100 may form more or fewer beams, and the network device 11 and the terminal device 100 may also form beams in various directions. This is not limited in this embodiment of this application.

Refer to FIG. 3. The network device 11 forms three transmit beams that are respectively denoted as a BM 20, a BM 21, and a BM 22. Directions of the three transmit beams are different. The BM 20 is a primary transmit beam, and signal strength of the BM 21 and the BM 22 in free space is less than that of the BM 20. The terminal device 100 forms three receive beams that are respectively denoted as a BM 10, a BM 11, and a BM 12. Directions of the three receive beams are different. The BM 10 is a primary transmit beam, and signal strength of both the BM 11 and the BM 12 in free space is less than that of the BM 10. It is assumed that the signal strength of the BM 11 in free space is greater than the signal strength of the BM 12 in free space.

FIG. 3 is still used as an example. Based on a beam scanning principle, the terminal device 100 and the network device 11 complete beam pairing, and the transmit beam BM 22 and the receive beam BM 12 form a beam pair. In other words, the transmit beam BM 22 is an optimal transmit beam of the network device, and the receive beam BM 12 is an optimal receive beam of the terminal device 100 at a location shown in FIG. 3. However, actually, because the signal strength of the receive beam BM 12 in free space is low, and is less than both the signal strength of the receive beam BM 11 and that of the primary receive beam BM 10, it may be thought that, if the location of the terminal device 100 is adjusted, so that the receive beam BM 11 or the primary receive beam BM 10 is used as the optimal receive beam of the adjusted terminal device 100, signal quality of the terminal device 100 after location adjustment is greatly improved compared with signal quality of the terminal device 100 at an original location.

Therefore, in this embodiment of this application, when signal quality of communication between the terminal device and the network device is poor, a direction (denoted as a first direction) of a target receive beam with good signal strength obtained when the terminal device is at the current location is determined, a direction of an optimal receive beam of the terminal device at the current location is used as a reference direction, angle information between the first direction and the reference direction is calculated, and a location of the terminal device is adjusted by using the angle information, so that an optimal receive beam of the adjusted terminal device is the target receive beam. In this way, the signal quality of communication can be accurately and effectively improved. In an ideal situation, the target receive beam is a primary receive beam. In this case, the terminal device may communicate with the network device by using the primary receive beam, so that signal quality can reach an optimal status.

It should be noted that a location change of the terminal device caused by the terminal device being adjusted from one location to another location described in this embodiment of this application includes not only a location change caused by movement of the terminal device, but also a location change caused by rotation of the terminal device. However, adjusting the location of the terminal device based on the angle information in this embodiment of this application is mainly a location change caused by rotation of the terminal device.

Figure 4:
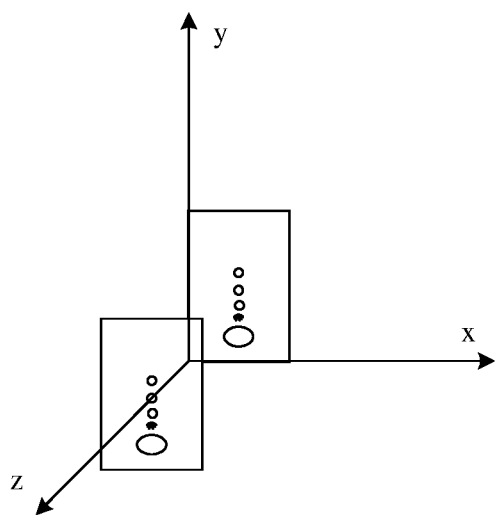
FIG. 4 is a schematic diagram of a location change of a terminal device caused by movement according to an embodiment of this application.

FIG. 4 is a schematic diagram of a location change of a terminal device caused by movement according to an embodiment of this application. Refer to FIG. 4, at the beginning, the terminal device is located at an origin of a coordinate system, and after the terminal device is moved for a distance along a z-axis, a location of the terminal device changes.

Figure 5:
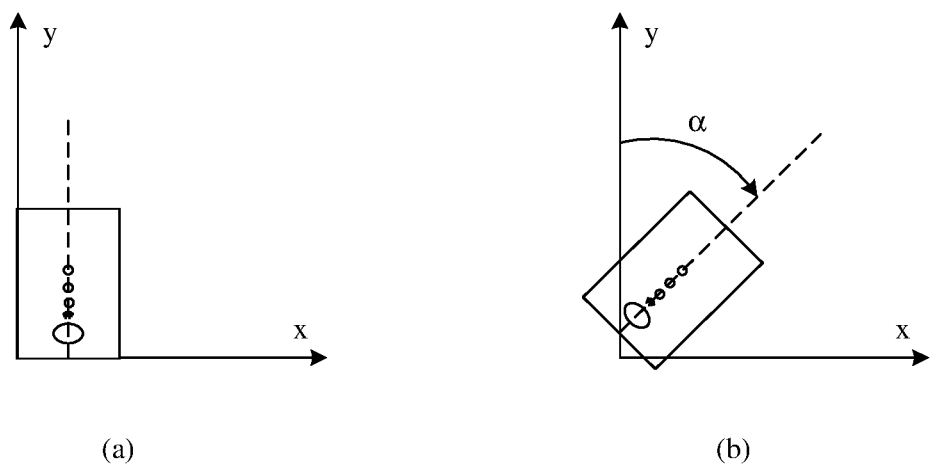
FIG. 5 is a schematic diagram of a location change of a terminal device caused by rotation according to an embodiment of this application.

FIG. 5 is a schematic diagram of a location change of a terminal device caused by rotation according to an embodiment of this application. Refer to (a) in FIG. 5. At the beginning, the terminal device is located at an origin of a coordinate system, a central axis of the terminal device is used as a reference object, an included angle between the central axis and a y-axis is 0 degrees, and the terminal device is rotated by an angle shown in (b) in FIG. 5, but the terminal device is not translated. The included angle between the central axis and the y-axis of the terminal device changes to $\alpha$, and a location of the terminal device changes.

With reference to FIG. 6 to FIG. 15, the following describes in detail a device orientation adjustment method in embodiments of this application.

It should be noted that, in this embodiment of this application, it is assumed that an optimal transmit beam of a network device remains unchanged, and the objective is to adjust a location of the terminal device to adjust an optimal receive beam of the terminal device. Therefore, for ease of description, a location at which the terminal device is located before adjustment is denoted as a first location, an optimal receive beam of the terminal device at the first location is denoted as a first optimal receive beam, a location at which the terminal device is located after adjustment is denoted as a second location, an optimal receive beam of the terminal device at the second location is denoted as a second optimal receive beam. In addition, the adjusting the terminal device from the first location to the second location in this embodiment of this application mainly relates to a location change of the terminal device caused by angle rotation.

Figure 6:
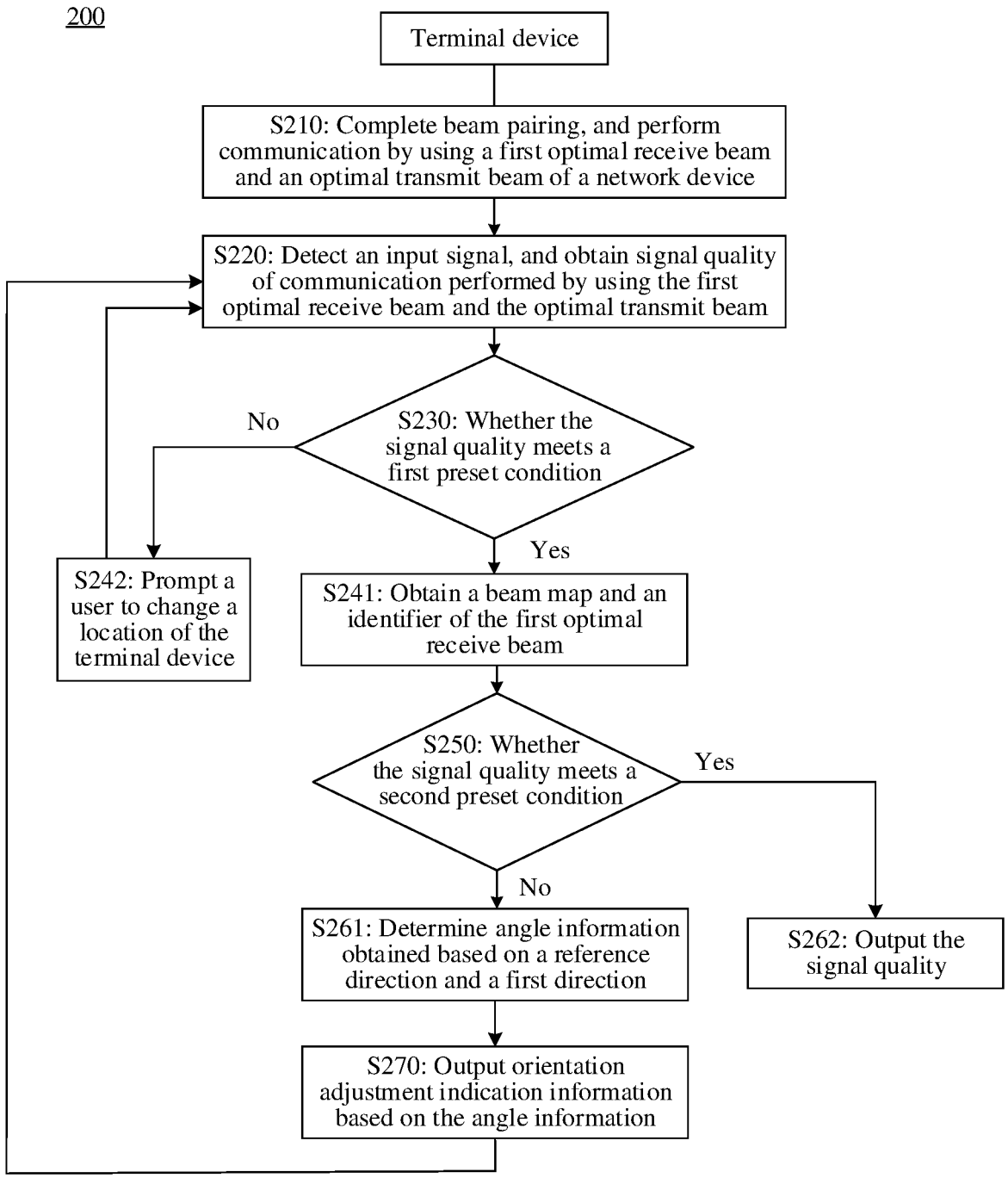
FIG. 6 is a schematic flowchart of a device orientation adjustment method according to an embodiment of this application.

FIG. 6 is a schematic flowchart of a device orientation adjustment method 200 according to an embodiment of this application. The method 200 may be executed by the terminal device 100 described above. The terminal device 100 outputs orientation adjustment indication information, so that a user adjusts a location of the terminal device 100 based on the orientation adjustment indication information.

S210: The terminal device at the first location completes beam pairing with a network device, and performs communication by using a first optimal receive beam and an optimal transmit beam of the network device. The first optimal receive beam is an optimal receive beam used by the terminal device to perform communication with the network device when the terminal device is at the first location, and a beam pair formed by beam pairing is: the first optimal receive beam and the optimal transmit beam.

For beam pairing, the terminal device and the network device implement beam pairing based on a beam scanning principle, and a process is roughly as follows:

1. The network device sequentially transmits signals by using transmit beams with different directions, to initiate beam (beam, BM) measurement. This process is referred to as beam scanning.

2. The terminal device measures signal quality of each of the plurality of transmit beams, and feeds back a measurement value to the network device. The network device determines a transmit beam with best signal quality as an optimal transmit beam based on the feedback value.

3. The network device initiates BM measurement on a receive beam of the optimal transmit beam. The terminal device measures signal quality between each of a plurality of receive beams and the optimal transmit beam, and feeds back the signal quality to the network device. The network device determines a receive beam with best signal quality as a first optimal receive beam based on the feedback value. In this way, the first optimal receive beam and the optimal transmit beam form a beam pair.

S220: The terminal device detects an input signal, and obtains signal quality of communication performed by using the first optimal receive beam and the optimal transmit beam, where the input signal is used to request signal quality.

In other words, the input signal is a trigger condition for the terminal device to perform signal quality detection, so as to determine whether to adjust a location of the terminal device.

In S220, the terminal device may obtain the input signal by using an input apparatus disposed on the terminal device.

In an example, the input apparatus includes a display. In this way, the terminal device may obtain an input signal by using the display. For example, a first interface may be displayed on the display, and the first interface includes a first control. The user may perform an operation such as sliding, tapping, pressing, or touching and holding on the first control. When detecting the operation performed by the user on the first control, the terminal device determines that a purpose of the user is to request signal quality. In this case, the terminal device obtains the signal quality of communication between the terminal device and the network device. A manner of detecting the input signal by using the display is intuitive and easy to implement, and user experience is good.

In another example, the input apparatus includes a button. The user implements input of an input signal by touching the button. When detecting an operation performed by the user on the button, the terminal device obtains the signal quality of communication between the terminal device and the network device.

In another example, the input apparatus includes a microphone. A user transmits a voice instruction, and the microphone collects a sound signal of the voice instruction to obtain an input signal. After detecting the sound signal, the terminal device obtains signal quality of communication between the terminal device and the network device.

It should be understood that the foregoing enumerated input apparatus and a manner of obtaining an input signal by using the input apparatus are only examples for description, and should not constitute a limitation on this embodiment of this application. Any other input apparatus and manner that can obtain an input signal shall fall within the protection scope of this embodiment of this application.

In this embodiment of this application, signal quality for communication between the terminal device and the network device may be determined based on at least one of the following parameters: a signal-to-noise ratio (signal-to-noise ratio, SINR) and a reference signal received power (reference signal receiving power, RSRP). RSRP may also be understood as signal strength.

S230: The terminal device determines whether the signal quality meets a first preset condition. If the signal quality does not meet the first preset condition, S242 is performed. Alternatively, if the signal quality meets the first preset condition, S241 is performed.

In an example, the first preset condition may be that the signal quality is greater than or equal to a first threshold. The first threshold is low, and is mainly used to determine whether there is a signal to a certain extent when the terminal device communicates with the network device at the first location. For example, the first threshold may be—120 decibel-milliwatts (dbm).

S242: If the signal quality does not meet the first preset condition, the terminal device outputs prompt information to prompt the user to change the location of the terminal device. In other words, if the signal quality is poor, the terminal device prompts the user to change the location of the terminal device.

Because the signal quality is very poor, the signal quality can be quickly improved only when the location of the terminal device is greatly adjusted. In this way, based on the improved signal quality, continuing to adjust the location of the terminal device by using the angle information is meaningful and more effective. Therefore, in this step, based on a prompt of the terminal device, the user mainly adjusts the location of the terminal device by moving the terminal device, so as to quickly improve signal quality. For example, the user may attempt to move the terminal device at different locations until there is a signal. In a process in which the user moves the terminal device, the terminal device may continue to perform S220, and determine signal quality of communication between the moved terminal device and the network device, until the signal quality meets the first preset condition, and perform S241.

The terminal device may output prompt information by using an output apparatus disposed on the terminal device. The output apparatus may be the same as or different from the input apparatus in step S220. This is not limited herein.

In an example, the output apparatus includes a display. In this way, the terminal device may output prompt information by using the display, to prompt the user to change the location of the terminal device. A manner of outputting prompt information by using the display is intuitive and easy to implement, and user experience is good.

In another example, the output apparatus includes a speaker, and the terminal device transmits a voice instruction by using the speaker, to prompt the user to change the location of the terminal device.

It should be understood that the foregoing enumerated output apparatus and a manner of outputting prompt information by using the output apparatus are only examples for description, and should not constitute a limitation on this embodiment of this application. Any other output apparatus and manner that can output a signal fall within the protection scope of this embodiment of this application.

S241: When the signal quality meets the first preset condition, the terminal device obtains a beam map of the terminal device and an identifier of the first optimal receive beam.

The terminal device may perform beam measurement with the network device, to determine a plurality of receive beams of the terminal device, and generate a beam map of the plurality of receive beams. The beam map is used to indicate spatial distribution of the plurality of receive beams of the terminal device, and a location and a direction of each receive beam may be determined by using the beam map. The beam map is a hemisphere diagram that is transmitted from the terminal device to one side of the terminal device. For example, a plane on which an antenna is located may be used as a vertical plane in the beam map, and a plane perpendicular to the plane on which the antenna is located is used as a horizontal plane.

Figure 7:
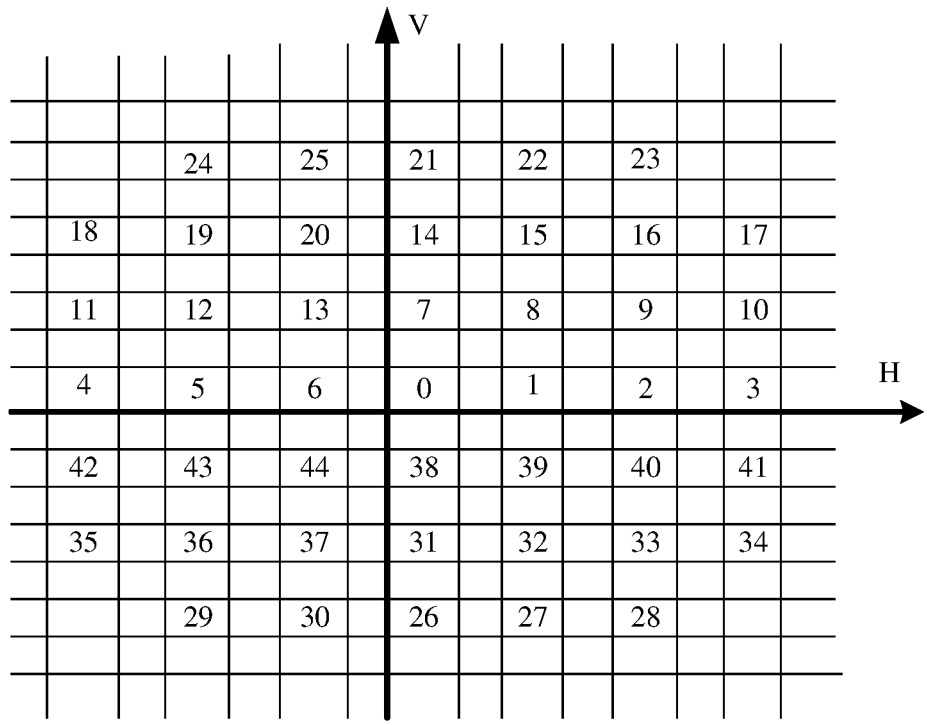
FIG. 7 is a schematic diagram of projection of a beam map on a plane according to an embodiment of this application.

FIG. 7 is a schematic diagram of projection of a beam map on a plane according to an embodiment of this application. Refer to FIG. 7. An H direction is a horizontal direction, a V direction is a vertical direction, and a plane formed by the H direction and the V direction may be understood as a plane in which an antenna is located.

A projection of a plurality of receive beams on a plane formed by an H direction and an X direction is shown in FIG. 7. Each small grid represents a receive beam, and a number on the grid is an identifier of a corresponding receive beam. A receive beam 0 is a primary receive beam, and has the best signal strength.

S250: The terminal device determines whether the signal quality meets a second preset condition. If the signal quality meets the second preset condition, S262 is performed. Alternatively, if the signal quality does not meet the second preset condition, S261 is performed.

The second preset condition is used to determine whether the terminal device needs to be rotated, so as to accurately and effectively adjust the location of the terminal device.

In an example, the second preset condition may be that the signal quality is greater than or equal to a second threshold. The second threshold is high. For example, the second threshold may be 95 decibel-milliwatts (dbm).

S262: If the signal quality meets the second preset condition, the terminal device outputs the signal quality.

In other words, when the signal quality is good, there is no need to adjust the location of the terminal device. Therefore, the terminal device may directly feed back the signal quality to the user, to notify the user that the current signal quality of the terminal device is good.

In S262, the terminal device may output the signal quality by using the output apparatus.

In an example, the output apparatus includes a display. In this way, the terminal device may output signal quality by using the display.

In another example, the output apparatus includes a speaker, and the terminal device transmits a voice signal by using the speaker, where the voice signal is used to indicate signal quality.

Optionally, the terminal device may further output the identifier of the first optimal receive beam.

S261: If the signal quality does not meet the second preset condition, the terminal device determines angle information obtained based on a reference direction and a first direction.

The reference direction is a direction of the first optimal receive beam, and the first direction is a direction that is of a target receive beam and that is obtained when the terminal device is at the first location, where signal strength of the target receive beam in free space is greater than signal strength of the first optimal receive beam in free space. The angle information may be used to represent an angle between the first direction and the reference direction.

In S261, the terminal device determines a location of the first optimal receive beam in the beam map by using the beam map and the identifier of the first optimal receive beam, uses a receive beam whose signal strength is greater than that of the first optimal receive beam in the beam map as the target receive beam, determines a direction (denoted as the first direction) that is of the target receive beam and that is obtained when the terminal device is at the first location, determines a direction (denoted as the reference direction) that is of the first optimal receive beam and that is obtained when the terminal device is at the first location, and calculates an orientation difference between the first direction and the reference direction, to obtain the angle information.

In this embodiment of this application, the angle information is used to indicate the at least one rotation angle and a rotation direction corresponding to each rotation angle, and the terminal device may rotate the corresponding rotation angle based on the rotation direction. If the terminal device is rotated by the corresponding rotation angle based on the rotation direction, the target receive beam may be rotated to a location in the first direction. In this way, an optimal receive beam of the terminal device after location adjustment may be the target receive beam, and signal quality of an optimal effect may be achieved. In an embodiment in which the angle information indicates a plurality of rotation angles, the terminal device may be rotated by corresponding rotation angles in sequence based on different rotation directions.

Based on a principle of a three-dimensional coordinate system, the angle information may indicate three rotation angles and three corresponding rotation directions, and one rotation direction is parallel to one coordinate axis.

In a process of calculating the angle information based on the first direction and the reference direction, for example, the reference direction of the first optimal receive beam is used as a direction of a coordinate axis of the three-dimensional coordinate system, a three-dimensional relative coordinate system is established, rotation angles of a target receive beam in the first direction on three coordinate axes are calculated, that is, three rotation angles of the terminal device are obtained, and the terminal device is rotated based on the three rotation angles, so that a direction of the target receive beam after a location change is the reference direction.

Figure 8:
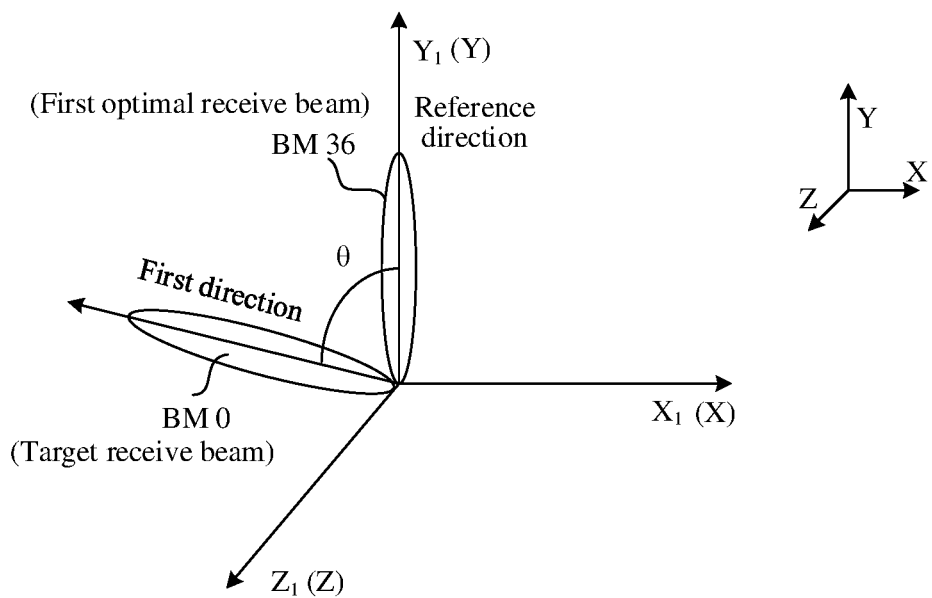
FIG. 8 is a schematic diagram of a target receive beam, a first optimal receive beam, a first direction, and a reference direction of a terminal device before location adjustment according to an embodiment of this application.

FIG. 8 is a schematic diagram of a target receive beam, a first optimal receive beam, a first direction, and a reference direction of a terminal device before location adjustment according to an embodiment of this application. Refer to FIG. 8, an absolute coordinate system is a three-dimensional coordinate system that is in an upper right corner and that includes an X axis, a Y axis, and a Z axis. When the terminal device is at the first location, the first optimal receive beam is a beam BM 36, the target receive beam is a beam BM 0, and a direction of the beam BM 36 is the reference direction. The reference direction is used as a direction of a coordinate axis in the relative coordinate system, and a relative coordinate system formed by an $X_1$ axis, a Y axis, and a Z axis shown in FIG. 8 is established. In this example, the absolute coordinate system formed by the X axis, the Y axis, and the Z axis exactly coincides with the relative coordinate system formed by the $X_1$ axis, the $Y_1$ axis, and the $Z_1$ axis. The reference direction is a Y axis direction, and is also a Y direction. When the terminal device is at the first location, an included angle between the first direction of the target receive beam BM 0 and the reference direction in space is. To enable the target receive beam BM 0 to be rotated to a position in the reference direction, it is assumed that rotation angles of the target receive beam BM 0 around the $X_1$ axis, the $Y_1$ axis, and the $Z_1$ axis are $\gamma$, $\beta$, and $\alpha$ respectively, three rotation matrices may be formed by $\gamma$, $\beta$, and $\alpha$, a first formula is formed based on the three rotation matrices, coordinates of the target receive beam BM 0, and coordinates of the first optimal receive beam BM 36, and the foregoing three angles may be obtained by using the first formula.

For example, the coordinates of the target receive beam BM 0 are $A=(x_1, y_1, z_1)$, the coordinates of the first optimal receive beam BM 36 are $B=(x_1', y_1', z_1')$, and rotation matrices of the target receive beam BM 0 rotated around the $X_1$ axis, the $Y_1$ axis, and the $Z_1$ axis are respectively $R_{X_1}(\gamma)$, $R_{Y_1}(\beta)$, and $R_{Z_1}(\alpha)$, where $$R_{X_1}(\gamma) = \begin{pmatrix} 1 & 0 & 0 \\ 0 & \cos\gamma & -\sin\gamma \\ 0 & \sin\gamma & \cos\gamma \end{pmatrix}, R_{Y_1}(\beta) = \begin{pmatrix} \cos\beta & 0 & \sin\beta \\ 0 & 1 & 0 \\ -\sin\beta & 0 & \cos\beta \end{pmatrix},$$

$$\text{and } R_{Z_1}(\alpha) = \begin{pmatrix} \cos\alpha & -\sin\alpha & 0 \\ \sin\alpha & \cos\alpha & 0 \\ 0 & 0 & 1 \end{pmatrix}.$$

In this case, the first formula is:

$$\begin{pmatrix} x_1 \\ y_1 \\ z_1 \end{pmatrix} = R_{Z_1}(\alpha) R_{Y_1}(\beta) R_{X_1}(\gamma) \begin{pmatrix} x_1' \\ y_1' \\ z_1' \end{pmatrix}.$$

In this way, the rotation angles $\gamma$, $\beta$, and $\alpha$ may be obtained based on the first formula. In this embodiment, the angle information may indicate: rotation angles $\gamma$, $\beta$, and $\alpha$, and rotation directions $X_1$ axis, $Y_1$ axis, and $Z_1$ axis.

S270: The terminal device outputs orientation adjustment indication information based on the angle information, where the orientation adjustment indication information is used to indicate a rotation operation on the terminal device.

The user may rotate the terminal device based on the orientation adjustment indication information, to adjust the terminal device from the first location to the second location. At the second location, the terminal device may pair a new receive beam (that is, a second optimal receive beam) with the optimal transmit beam for use, to improve signal quality of communication. The second optimal receive beam is the target receive beam.

In some embodiments, based on the orientation adjustment indication information, the user can accurately rotate the terminal device based on the indication. In this case, refer to (a) in FIG. 9. When the terminal device is at the second location, the direction of the target receive beam BM 0 and the reference direction overlap, and the target receive beam BM 0 may be used as the second optimal receive beam of the terminal device at the second location. In this way, the target receive beam is paired with the optimal transmit beam, so that signal quality of communication can reach the best, and the previous first optimal receive beam BM 36 is rotated to another direction.

It should be understood that two directions "overlap" herein may be understood as "completely overlapping", "approximately overlapping", or "basically overlapping", and "approximately overlapping" or "basically overlapping" may be understood as that there is a very small included angle between the two directions.

In some other embodiments, based on the orientation adjustment indication information, the user only roughly rotates the terminal device. In this case, refer to (b) in FIG. 9. When the terminal device is at the second location, the direction of the target receive beam BM 0 and the reference direction do not overlap, and there is an included angle $\delta$ between the direction of the target receive beam BM 0 and the reference direction. The included angle δ is greater than 0 and less than an included angle θ between the reference direction and the first direction. Generally, the included angle d is small. In this embodiment, although the target receive beam is not completely rotated to the reference direction, the target receive beam is very close to the reference direction, the second optimal receive beam of the terminal device may also be the target receive beam. Although signal quality may not achieve a best effect, the signal quality is not poor, and an effect is much better than that of signal quality before position adjustment.

As described above, a primary receive beam is a beam with best signal strength in free space. Therefore, in some examples, the target receive beam in this embodiment of this application is the primary receive beam.

In this embodiment of this application, the orientation adjustment indication information may include angle information, or may include processed angle information. The processed angle information facilitates identification and operation by the user. For example, the three-dimensional coordinate system shown in FIG. 8 is still used as an example. The angle information includes rotation angles γ, β, and α, and rotation directions $X_1$ axis, $Y_1$ axis, and $Z_1$ axis. After the angle information is processed, the rotation angles in the processed angle information change to an angle a and an angle b, and the rotation direction changes to left, right, inward, or outward, where the rotation direction is a direction seen by the user facing the terminal device.

In addition, the orientation adjustment indication information may further include parameters such as the signal quality, the first direction, and the reference direction, and the user may intuitively know related information.

In this embodiment of this application, the terminal device may output the orientation adjustment indication information by using the output apparatus.

In an example, the output apparatus includes a display, and the terminal device may output the orientation adjustment indication information by using the display. Refer to (a) in FIG. 10. The orientation adjustment instruction information is displayed on the display in a graphical manner, to instruct the user to first rotate the terminal device rightward by 30 degrees, and then rotate the terminal device inward by 10 degrees. Refer to (b) in FIG. 10. The orientation adjustment indication information instructs the user to rotate the terminal device inward by 15 degrees. The manner of outputting the orientation adjustment indication information in a graphical manner by using the display is intuitive, easy to understand, and easy to implement, which facilitates a user operation, and user experience is good.

In another example, the output apparatus includes a speaker, and the terminal device may output the orientation adjustment indication information by using a voice instruction transmitted by the speaker, to instruct the user how to adjust the terminal device.

When adjusting the location of the terminal device, the user may not completely rotate the terminal device based on the orientation adjustment indication information. As a result, an optimal receive beam of the terminal device after location adjustment is not the target receive beam, and signal quality is not good. Therefore, after adjusting the terminal device, the user may trigger the terminal device, so that the terminal device continues to perform S220, and detects signal quality of communication between the terminal device and the network device after location adjustment. If the signal quality meets the second preset condition, it means that the location of the terminal device is adjusted in place, and no more adjustment is required. If the signal quality does not meet the second preset condition, S261 and S270 may continue to be performed to adjust the location of the terminal device. The position of the terminal device cannot be adjusted in place until the signal quality meets the second preset condition.

It should be understood that a process of the method 200 shown in FIG. 6 is only an example for description. The method 200 may include more or less steps, and may also implement location adjustment of the terminal device.

For example, in the method 200, S230 may not be required. After performing S220, the terminal device may directly perform S241, and the location of the terminal device may also be adjusted. However, when signal quality is very poor, the user may need to move while rotating the terminal device, so as to improve the signal quality as soon as possible.

It should be further understood that, sequence numbers of the foregoing processes in the method 200 do not mean execution sequences. An execution sequences of the processes should be determined based on functions and internal logic of the processes, and should not be construed as any limitation on the implementation processes of this embodiment of this application.

For example, an execution sequence of S241 and S250 may be changed. In other words, 250 may be directly performed after S230 is performed, and when the signal quality does not meet the second preset condition, S241 is performed.

According to the device orientation adjustment method provided in this embodiment of this application, when signal quality of communication performed by using the first optimal receive beam and the optimal transmit beam of the network device by the terminal device at the first location is poor, the direction that is of the target receive beam and that is obtained when the terminal device is at the first location is determined, the direction that is of the first optimal receive beam and that is obtained when the terminal device is at the first location is determined, the angle information is obtained based on the two directions, and a location of the terminal device is adjusted by using the angle information, so that the second optimal receive beam that is used by the terminal device that is adjusted to the second location to perform communication with the network device can be used as the target receive beam. In this way, the signal quality of communication can be accurately and effectively improved.

In an embodiment in which the target receive beam is the primary receive beam, the terminal device may communicate with the network device by using the primary receive beam, so that signal quality can reach an optimal status.

Figure 11:
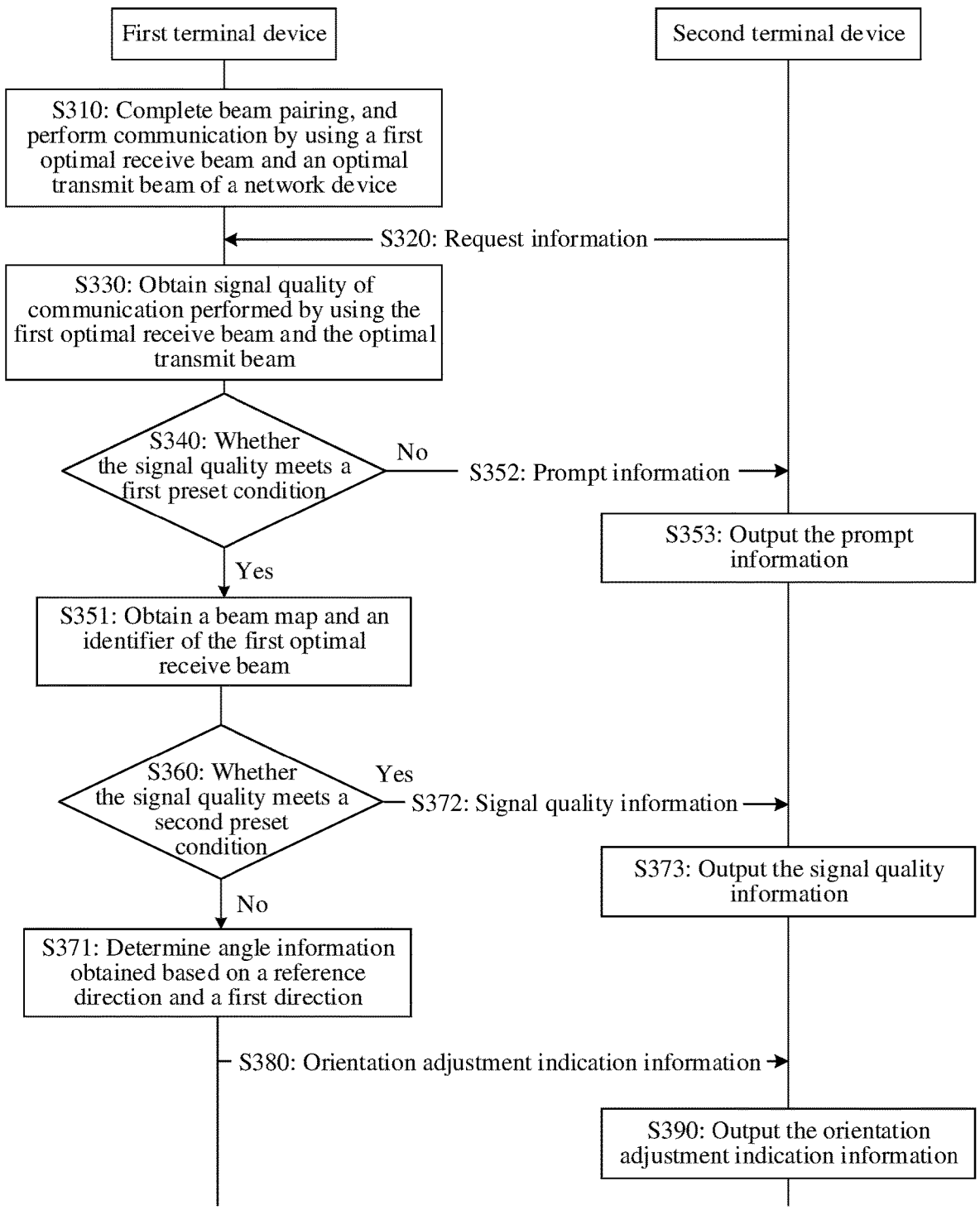
FIG. 11 is another schematic flowchart of a device orientation adjustment method according to an embodiment of this application.

FIG. 11 is a schematic flowchart of a device orientation adjustment method 300 according to an embodiment of this application. The method 300 is performed by a first terminal device. The first terminal device may be the terminal device 100 described above. The first terminal device transmits orientation adjustment indication information to a second terminal device, the second terminal device outputs the orientation adjustment indication information, and a user adjusts a location of the first terminal device based on the orientation adjustment indication information. The method 300 may be well applicable to a scenario in which the first terminal device is a device that is not frequently carried by the user, and the second terminal device is a handheld terminal that is frequently carried by the user. For example, the first terminal device is a CPE, and the second terminal device is a mobile phone. In this way, it is convenient for the user to detect the signal quality at any time to adjust a location of the device in time, and flexibility is higher.

S310: The first terminal device at a first location completes beam pairing with a network device, and performs communication by using a first optimal receive beam and an optimal transmit beam of the network device.

For specific descriptions of S310, refer to related descriptions of S210 in the method 200. Details are not described again.

S320: The second terminal device transmits request information to the first terminal device, where the request information is used to request signal quality.

For example, the user may perform a related operation on the second terminal device, so that the second terminal device transmits the request information. For example, an application related to the first terminal device may be installed on the second terminal device, and the user operates a related control in the application to trigger sending of the request information.

In other words, the request information is a trigger condition for triggering the first terminal device to perform signal quality detection, to determine whether to adjust the location of the first terminal device.

S330: The first terminal device obtains signal quality of communication performed by using the first optimal receive beam and the optimal transmit beam based on the request information.

S340: The first terminal device determines whether the signal quality meets a first preset condition. If the signal quality does not meet the first preset condition, S352 is performed. Alternatively, if the signal quality meets the first preset condition, S351 is performed.

For specific descriptions of the first preset condition, refer to related descriptions of the first preset condition in S230 in the method 200. Details are not described again.

S352: If the signal quality does not meet the first preset condition, the first terminal device transmits prompt information to the second terminal device, to prompt the user to change the location of the first terminal device.

S353: The second terminal device outputs the prompt information.

In other words, if the signal quality is very poor, the first terminal device transmits the prompt information to the second terminal device, so that the second terminal device outputs the prompt information, so as to determine that the location of the terminal device needs to be changed.

Because the signal quality is very poor, the signal quality can be quickly improved only when the location of the first terminal device is greatly adjusted. In this way, based on the improved signal quality, continuing to adjust the location of the first terminal device by using the angle information is meaningful and more effective. Therefore, in this step, based on the prompt information, the user adjusts the location of the first terminal device mainly by moving the first terminal device, so as to quickly improve the signal quality. For example, the user may attempt to move the first terminal device at different locations until there is a signal. In a process of moving the first terminal device, the user may operate the second terminal device to perform S320, so that the first terminal device performs S330 and S340, determines signal quality of communication between the moved first terminal device and the network device, and performs S351 until the signal quality meets the first preset condition.

For specific descriptions of outputting the prompt information by the second terminal device, refer to related descriptions of outputting the prompt information by the terminal device in S242 in the method 200. Details are not described again.

S351: When the signal quality meets the first preset condition, the first terminal device obtains a beam map of the first terminal device and an identifier of the first optimal receive beam.

For specific descriptions of S351, refer to related descriptions of S241 in the method 200. Details are not described again.

S360: The first terminal device determines whether the signal quality meets a second preset condition. If the signal quality meets the second preset condition, S372 is performed. Alternatively, if the signal quality does not meet the second preset condition, S371 is performed.

For specific descriptions of the second preset condition, refer to related descriptions of the second preset condition in S251 in the method 200. Details are not described again.

S372: If the signal quality meets the second preset condition, the first terminal device transmits signal quality information to the second terminal device.

S373: The second terminal device outputs the signal quality information.

To be specific, when the signal quality is good, there is no need to adjust the location of the first terminal device. Therefore, the first terminal device may directly transmit the signal quality information to the second terminal device, so that the second terminal device feeds back the signal quality to the user, to notify the user that the signal quality of current communication of the first terminal device is very good.

For specific descriptions of outputting the signal quality information by the second terminal device, refer to related descriptions of outputting the signal quality information by the terminal device in S262 in the method 200. Details are not described again.

S371: If the signal quality does not meet the second preset condition, the first terminal device determines angle information obtained based on a reference direction and a first direction.

For specific descriptions of S371, refer to related descriptions of S261 in the method 200. Details are not described again.

S380: The first terminal device transmits orientation adjustment indication information to the second terminal device based on the angle information, where the orientation adjustment indication information is used to indicate a rotation operation performed on the first terminal device.

The orientation adjustment indication information may include the angle information, or may include processed angle information, and the processed angle information facilitates identification and operation by the user. In addition, the orientation adjustment indication information may further include parameters such as the signal quality, the first direction, and the reference direction, and the user may intuitively know related information. For specific descriptions of the orientation adjustment indication information, refer to related descriptions of the orientation adjustment indication information in S270. Details are not described again.

S390: The second terminal device outputs the orientation adjustment indication information.

The second terminal device outputs the received orientation adjustment indication information, and the user may rotate the first terminal device based on the orientation adjustment indication information, to adjust the first terminal device from the first location to a second location. At the second location, the first terminal device may pair a second optimal receive beam with the optimal transmit beam for use, to improve signal quality of communication. The second optimal receive beam is the target receive beam. For specific descriptions of a relationship between the second optimal receive beam, the target receive beam, and the reference direction, refer to related descriptions of the second optimal receive beam, the target receive beam, and the reference direction based on FIG. 9 in S270 of the method 200. Details are not described again.

In addition, for specific descriptions that the second terminal device may output the orientation adjustment indication information by using an output apparatus, refer to related descriptions that the terminal device outputs the orientation adjustment indication information by using the output apparatus in S270 in the method 200. Details are not described again.

It should be understood that a process of the method 300 shown in FIG. 11 is only an example for description. The method 300 may include more or less steps, and may also implement location adjustment of the terminal device.

For example, in the method 300, S340 may not be required. After performing S330, the terminal device may directly perform S351, and the location of the first terminal device may also be adjusted. However, when signal quality is very poor, the user may need to move while rotating the first terminal device, so as to improve the signal quality as soon as possible.

It should be further understood that, sequence numbers of the foregoing processes in the method 300 do not mean execution sequences. An execution sequences of the processes should be determined based on functions and internal logic of the processes, and should not be construed as any limitation on the implementation processes of this embodiment of this application.

For example, an execution sequence of S351 and S360 may be changed. In other words, after S340 is performed, 360 may be directly performed, and when the signal quality does not meet the second preset condition, S351 is performed.

According to the device orientation adjustment method provided in this embodiment of this application, when signal quality of communication performed by using the first optimal receive beam and the optimal transmit beam of the network device by the first terminal device at the first location is poor, the direction that is of the target receive beam and that is obtained when the first terminal device is at the first location is determined, the direction that is of the first optimal receive beam and that is obtained when the first terminal device is at the first location is determined, the angle information is obtained based on the two directions, the orientation adjustment indication information is sent to the second terminal device by using the angle information, the second terminal device outputs the orientation adjustment indication information, so that the user can adjust the location of the first terminal device, and the second optimal receive beam that is used by the first terminal device that is adjusted to the second location to perform communication with the network device can be used as the target receive beam. In this way, the signal quality of communication can be accurately and effectively improved.

In an embodiment in which the target receive beam is a primary receive beam, the first terminal device may communicate with the network device by using the primary receive beam, so that signal quality can reach an optimal status.

Figure 12:
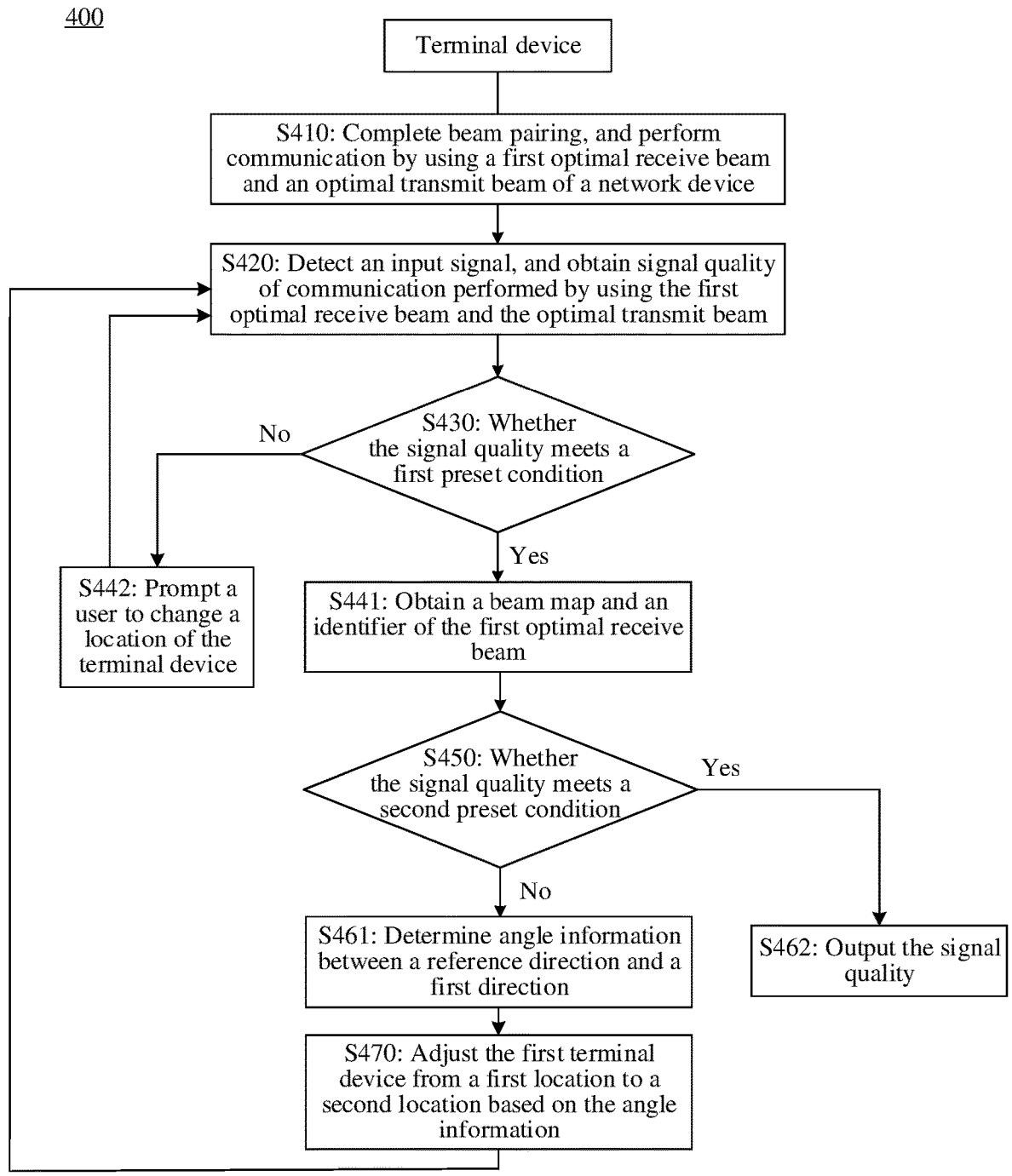
FIG. 12 is another schematic flowchart of a device orientation adjustment method according to an embodiment of this application.

FIG. 12 is a schematic flowchart of a device orientation adjustment method 400 according to an embodiment of this application. The method 400 is performed by a terminal device. The terminal device may be the foregoing terminal device 100. In addition, a location of the terminal device may be adjusted by the terminal device, and a user does not need to perform manual adjustment. Because participation of the user is reduced, on one hand, intelligence of the terminal device can be improved, and user experience can be improved; on the other hand, an error of device orientation adjustment caused by a manual adjustment can be avoided, and precision of device orientation adjustment can be improved, so that signal quality in a communication process can be better improved.

S410: The terminal device at a first location completes beam pairing with a network device, and performs communication by using a first optimal receive beam and an optimal transmit beam of the network device.

For specific descriptions of S410, refer to related descriptions of S210 in the method 200. Details are not described again.

S420: The terminal device detects an input signal, and obtains signal quality of communication performed by using the first optimal receive beam and the optimal transmit beam, where the input signal is used to request signal quality.

For specific descriptions of S420, refer to related descriptions of S220 in the method 200. Details are not described again.

S430: The terminal device determines whether the signal quality meets a first preset condition. If the signal quality does not meet the first preset condition, S442 is performed. Alternatively, if the signal quality meets the first preset condition, S441 is performed.

S442: If the signal quality does not meet the first preset condition, the terminal device outputs prompt information to prompt a user to change a location of the terminal device.

S441: When the signal quality meets the first preset condition, the terminal device obtains a beam map of the terminal device and an identifier of the first optimal receive beam.

For specific descriptions of S430, S442, and S441, refer to related descriptions of S230, S242, and S241 in the method 400. Details are not described again.

S450: The terminal device determines whether the signal quality meets a second preset condition. If the signal quality meets the second preset condition, S462 is performed. Alternatively, if the signal quality does not meet the second preset condition, S461 is performed.

S462: If the signal quality meets the second preset condition, the terminal device outputs the signal quality.

S461: If the signal quality does not meet the second preset condition, the terminal device determines angle information obtained based on a reference direction and a first direction.

For specific descriptions of S450, S462, and S461, refer to related descriptions of S250, S262, and S261 in the method 400. Details are not described again.

S470: The terminal device adjusts the terminal device from the first location to a second location based on the angle information. A second optimal receive beam used by the terminal device to communicate with the optimal transmit beam at the second location is a target receive beam.

In some embodiments, the terminal device may be connected to a base, and the base is configured to fasten the terminal device, so as to support and fasten the terminal device in an automatic rotation process of the terminal device.

In some other embodiments, a driving apparatus may be further disposed on the base. One end of the driving apparatus is connected to the terminal device, and the other end is connected to the base. The processor may control the driving apparatus to drive the terminal device to automatically rotate to the second position based on a rotation angle in the angle information. For example, the drive apparatus may be a motor.

After the terminal device is adjusted to the second location, the terminal device may be triggered, so that the terminal device continues to perform S420, and detects signal quality of communication between the terminal device and the network device after location adjustment. If the signal quality meets the second preset condition, it means that the location of the terminal device is adjusted in place, and no more adjustment is required. If the signal quality does not meet the second preset condition, S461 and S470 may continue to be performed to adjust the location of the terminal device. The position of the terminal device cannot be adjusted in place until the signal quality meets the second preset condition. However, in this embodiment, because the terminal device adjusts the position by the terminal device, an error of manual adjustment is reduced, and basically, the terminal device can be adjusted in place at a time.

According to the device orientation adjustment method provided in this embodiment of this application, when signal quality of communication performed by using the first optimal receive beam and the optimal transmit beam of the network device by the terminal device at the first location is poor, the direction that is of the target receive beam and that is obtained when the terminal device is at the first location is determined, the direction that is of the first optimal receive beam and that is obtained when the terminal device is at the first location is determined, the angle information is obtained based on the two directions, and the terminal device is adjusted to the second location by using the angle information, so that the second optimal receive beam that is used by the terminal device at the second location to perform communication with the network device can be used as the target receive beam. In this way, the signal quality of communication can be accurately and effectively improved.

In addition, because the user does not need to perform manual adjustment, participation of the user is reduced, on one hand, intelligence of the terminal device can be improved, and user experience can be improved; on the other hand, an error of device orientation adjustment caused by a manual adjustment can be avoided, and precision of device orientation adjustment can be improved, so that signal quality in a communication process can be better improved.

In an embodiment in which the target receive beam is a primary receive beam, the terminal device may communicate with the network device by using the primary receive beam, so that signal quality can reach an optimal status.

Figure 13:
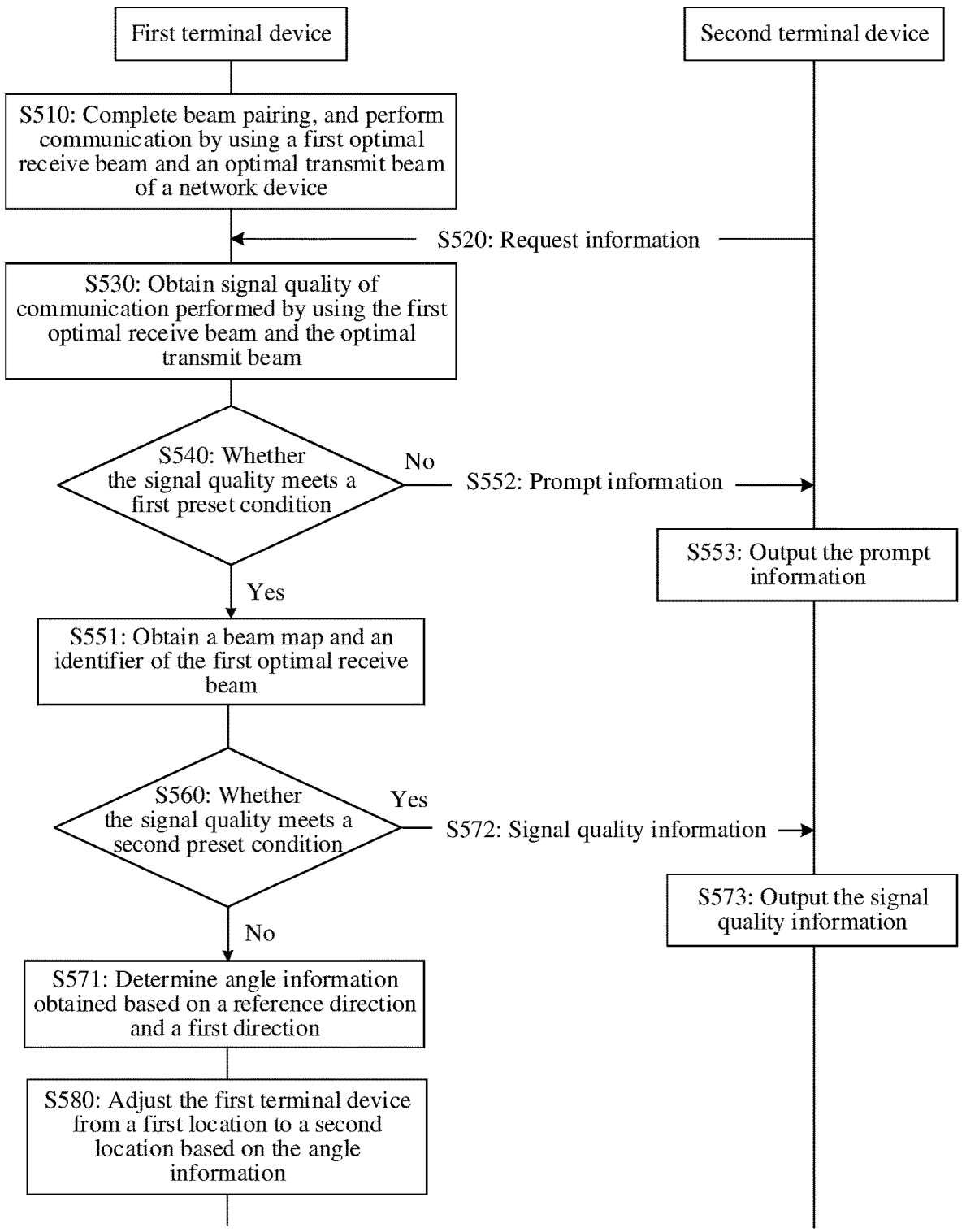
FIG. 13 is another schematic flowchart of a device orientation adjustment method according to an embodiment of this application.

FIG. 13 is a schematic flowchart of a device orientation adjustment method 500 according to an embodiment of this application. The method 500 is performed by a first terminal device. The first terminal device may be the terminal device 100 described above. A second terminal device may trigger the first terminal device to detect signal quality, so that when the signal quality is poor, the first terminal device adjusts a location of the first terminal device, and a user does not need to perform manual adjustment. Because participation of the user is reduced, on one hand, intelligence of the terminal device can be improved, and user experience can be improved; on the other hand, an error of device orientation adjustment caused by a manual adjustment can be avoided, and precision of device orientation adjustment can be improved, so that signal quality in a communication process can be better improved. In addition, the method 500 may be well applicable to a scenario in which a first terminal device is a device that is not frequently carried by a user, and a second terminal device is a handheld terminal that is frequently carried by the user. For example, the first terminal device is a CPE, and the second terminal device is a mobile phone. In this way, the user can detect signal quality at any time to adjust a location of the device in time, and flexibility is higher.

S510: The first terminal device at a first location completes beam pairing with a network device, and performs communication by using a first optimal receive beam and an optimal transmit beam of the network device.

For specific descriptions of S510, refer to related descriptions of S310 in the method 300. Details are not described again.

S520: The second terminal device transmits request information to the first terminal device, where the request information is used to request signal quality.

For specific descriptions of S520, refer to related descriptions of S320 in the method 300. Details are not described again.

S530: The first terminal device obtains signal quality of communication performed by using the first optimal receive beam and the optimal transmit beam based on the request information.

S540: The first terminal device determines whether the signal quality meets a first preset condition. If the signal quality does not meet the first preset condition, S552 is performed. Alternatively, if the signal quality meets the first preset condition, S551 is performed.

For specific descriptions of the first preset condition, refer to related descriptions of the first preset condition in S330 in the method 300. Details are not described again.

S552: If the signal quality does not meet the first preset condition, the first terminal device transmits prompt information to the second terminal device, to prompt the user to change the location of the first terminal device.

S553: The second terminal device outputs the prompt information.

For specific descriptions of S552 and S553, refer to related descriptions of S352 and S353 in the method 300.

S551: When the signal quality meets the first preset condition, the first terminal device obtains a beam map of the first terminal device and an identifier of the first optimal receive beam.

For specific descriptions of S551, refer to related descriptions of S351 in the method 300. Details are not described again.

S560: The first terminal device determines whether the signal quality meets a second preset condition. If the signal quality meets the second preset condition, S572 is performed. Alternatively, if the signal quality does not meet the second preset condition, S571 is performed.

For specific descriptions of the second preset condition, refer to related descriptions of the second preset condition in S360 in the method 300. Details are not described again.

S572: If the signal quality meets the second preset condition, the first terminal device transmits signal quality information to the second terminal device.

S573: The second terminal device outputs the signal quality information.

For specific descriptions of S572 and S573, refer to related descriptions of S372 and S373 in the method 300. Details are not described again.

S571: If the signal quality does not meet the second preset condition, the first terminal device determines angle information obtained based on a reference direction and a first direction.

S580: The first terminal device adjusts the first terminal device from the first location to a second location based on the angle information.

For specific descriptions of S571 and S571, refer to related descriptions of S461 and S470 in the method 400. Details are not described again.

Figure 14:
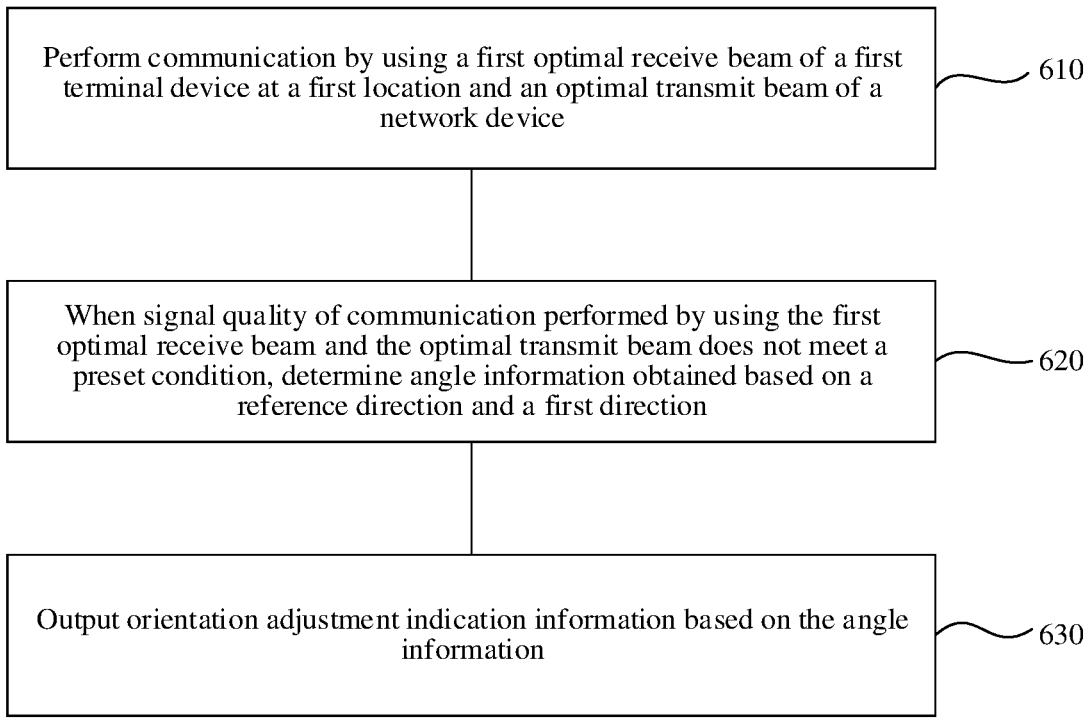
FIG. 14 is another schematic flowchart of a device orientation adjustment method according to an embodiment of this application.

FIG. 14 is a schematic flowchart of a device orientation adjustment method 600 according to an embodiment of this application. Refer to FIG. 14. The method is performed by a first terminal device, and the first terminal device may be the terminal device in FIG. 6 or the first terminal device in FIG. 11. The following describes each step.

S610: Perform communication by using a first optimal receive beam of the first terminal device at a first location and an optimal transmit beam of a network device.

For specific descriptions of this step, refer to related descriptions of step S210 in the method 200. Details are not described again.

S620: When signal quality of performing communication by using the first optimal receive beam and the optimal transmit beam does not meet a preset condition, determine angle information obtained based on a reference direction and a first direction, where the reference direction is a direction that is of the first optimal receive beam and that is obtained when the first terminal device is at the first location, the first direction is a direction that is of a target receive beam and that is obtained when the first terminal device is at the first location, signal strength of the target receive beam in free space is greater than signal strength of the first optimal receive beam in free space, and the angle information is used to indicate at least one rotation angle and a rotation direction corresponding to each rotation angle.

Optionally, the preset condition includes: the signal quality is greater than or equal to a threshold. The preset condition may be the second preset condition in the foregoing method 200 or 300.

Optionally, the target receive beam is a primary receive beam, and the primary receive beam is a beam with highest signal strength in free space in a plurality of receive beams of the first terminal device.

In this embodiment of this application, the primary receive beam is used as the target receive beam, and the device is adjusted based on the angle information obtained based on the direction of the primary receive beam and the direction of the first optimal receive beam that are obtained when the first terminal device is at the first location, so that the adjusted first terminal device can perform communication with the network device by using the primary receive beam, signal quality of communication between the first terminal device and the network device can be very good, and user experience is in a good status.

As an example and not a limitation, the target receive beam may alternatively be another beam whose signal strength is greater than that of the first optimal receive beam, which is not limited in this embodiment of this application.

Optionally, the determining angle information obtained based on a reference direction and a first direction includes:
determining the angle information based on a beam map of the first terminal device, where the beam map is used to indicate spatial distribution of a plurality of receive beams of the first terminal device.

For specific descriptions of step S620, refer to related descriptions of step S261 in the method 200. Details are not described again.

S630: Output orientation adjustment indication information based on the angle information, where the orientation adjustment indication information is used to indicate a rotation operation for the first terminal device, so that the first terminal device can be adjusted from the first location to a second location, and a second optimal receive beam used by the first terminal device to perform communication with the optimal transmit beam at the second location is the target receive beam.

Figure 9:
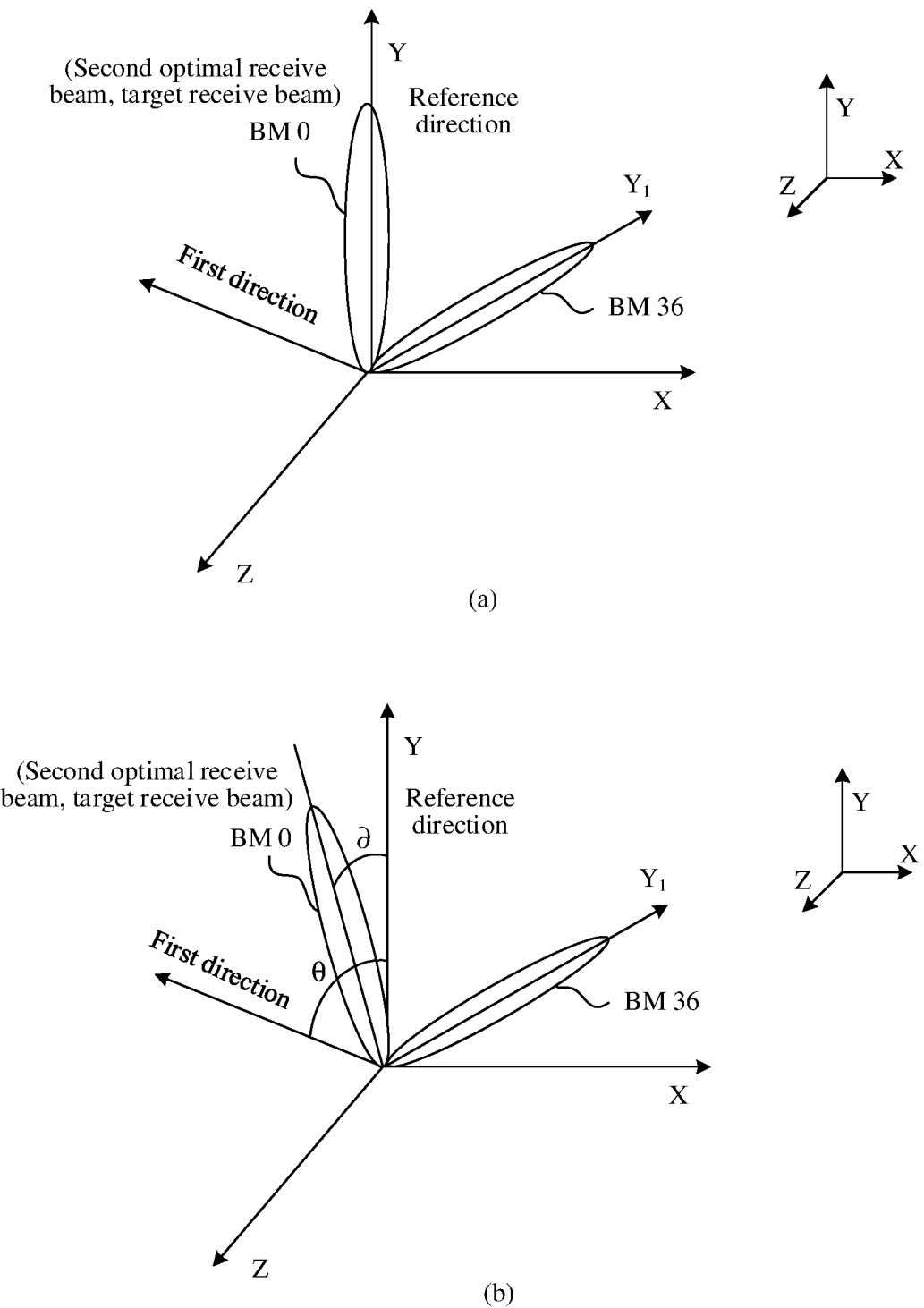
FIG. 9 is a schematic diagram of a target receive beam, a second optimal receive beam, a first optimal receive beam, a first direction, and a reference direction of a terminal device after location adjustment according to an embodiment of this application.

Optionally, when the first terminal device is at the second location, a direction of the target receive beam and the reference direction overlap, as shown in (a) in FIG. 9. In this way, the signal quality of communication can be further improved.

As an example and not a limitation, the target receive beam may alternatively be another beam whose signal strength is greater than that of the first optimal receive beam, which is not limited in this embodiment of this application. For example, refer to (b) in FIG. 9.

In some embodiments, the outputting orientation adjustment indication information based on the angle information includes:
controlling a display to display a first interface based on the angle information, where the first interface includes the orientation adjustment indication information generated in a graphical manner.

For example, the orientation adjustment indication information may include the angle information, or may include processed angle information, and the processed angle information facilitates identification and operation by the user.

Figure 10:
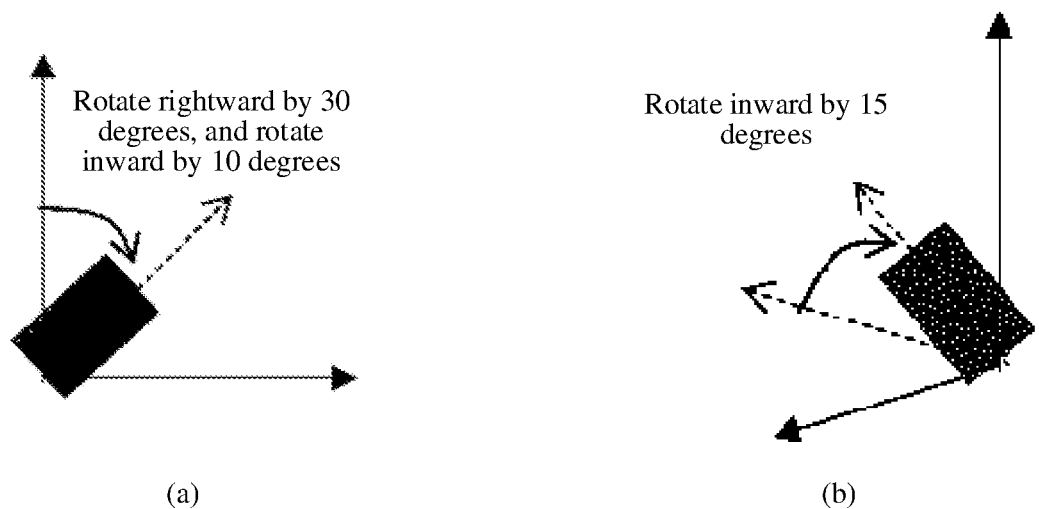
FIG. 10 is a schematic diagram of graphical orientation adjustment indication information displayed on a display according to an embodiment of this application.

For example, content shown in FIG. 10 is orientation adjustment indication information that is generated in a graphical manner and that is displayed on the display, to facilitate identification and operation by the user. The orientation adjustment angle information may be processed angle information.

For specific descriptions of this embodiment, refer to related descriptions of step S270 in the method 200. Details are not described again.

In this embodiment of this application, the first terminal device displays graphical orientation adjustment indication information by using the display, which is intuitive and easy to implement, and user experience is good.

Optionally, before the determining angle information obtained based on a reference direction and a first direction, the method further includes:
detecting an operation performed by a user on the display; and
detecting, in response to the operation, signal quality of communication performed by using the first optimal receive beam and the optimal transmit beam.

An operation of the user on the display may be used as a trigger condition for requesting signal quality. After detecting the operation, the first terminal device detects signal quality of communication between the first terminal device and the network device.

For example, a first interface may be displayed on the display, and the interface includes a first control. The user may perform an operation such as sliding, tapping, pressing, or touching and holding on the first control. When detecting the operation performed by the user on the first control, the first terminal device determines that a purpose of the user is to request signal quality. In this case, the first terminal device obtains the signal quality of communication between the first terminal device and the network device.

In this embodiment of this application, the user may perform an operation on the display. After detecting the operation, the first terminal device detects the signal quality of communication between the first terminal device and the network device, which is intuitive and easy to implement, and user experience is good.

In some other embodiments, the outputting the orientation adjustment indication information based on the angle information includes:

transmitting the orientation adjustment indication information to a second terminal device based on the angle information.

In this embodiment of this application, the first terminal device transmits the orientation adjustment indication information to the second terminal device, so that the second terminal device can output the orientation adjustment indication information to the user for the user to adjust the device. In a case in which the first terminal device is not a handheld terminal, and the second terminal device is a handheld terminal that is often carried by the user, for example, a mobile phone, the user knows how to adjust the device at any time, and flexibility is higher.

Optionally, before the determining angle information obtained based on a reference direction and a first direction, the method further includes:

receiving request information transmitted by the second terminal device, where the request information is used to request signal quality; and detecting, based on the request information, signal quality of communication performed by using the first optimal receive beam and the optimal transmit beam.

The request information is a trigger condition for triggering the first terminal device to perform signal quality detection, to determine whether to adjust the location of the first terminal device.

For example, the user may perform a related operation on the second terminal device, so that the second terminal device transmits the request information. For example, an application related to the first terminal device may be installed on the second terminal device, and the user operates a related control in the application to trigger sending of the request information.

In this embodiment of this application, the second terminal device transmits the request information for requesting the signal quality to the first terminal device. When the first terminal device is not a handheld terminal, and the second terminal device is a handheld terminal that is often carried by the user, for example, a mobile phone, it is convenient for the user to detect the signal quality at any time to adjust a location of the device in time, and flexibility is higher.

According to the device orientation adjustment method provided in this embodiment of this application, when signal quality of communication performed by using the first optimal receive beam and the optimal transmit beam of the network device by the first terminal device at the first location is poor, the direction that is of the target receive beam and that is obtained when the first terminal device is at the first location is determined, the direction that is of the first optimal receive beam and that is obtained when the first terminal device is at the first location is determined, the angle information is obtained based on the two directions, and a location of the first terminal device is adjusted by using the angle information, so that the second optimal receive beam that is used by the first terminal device that is adjusted to the second location to perform communication with the network device can be used as the target receive beam. In this way, the signal quality of communication can be accurately and effectively improved.

Figure 15:
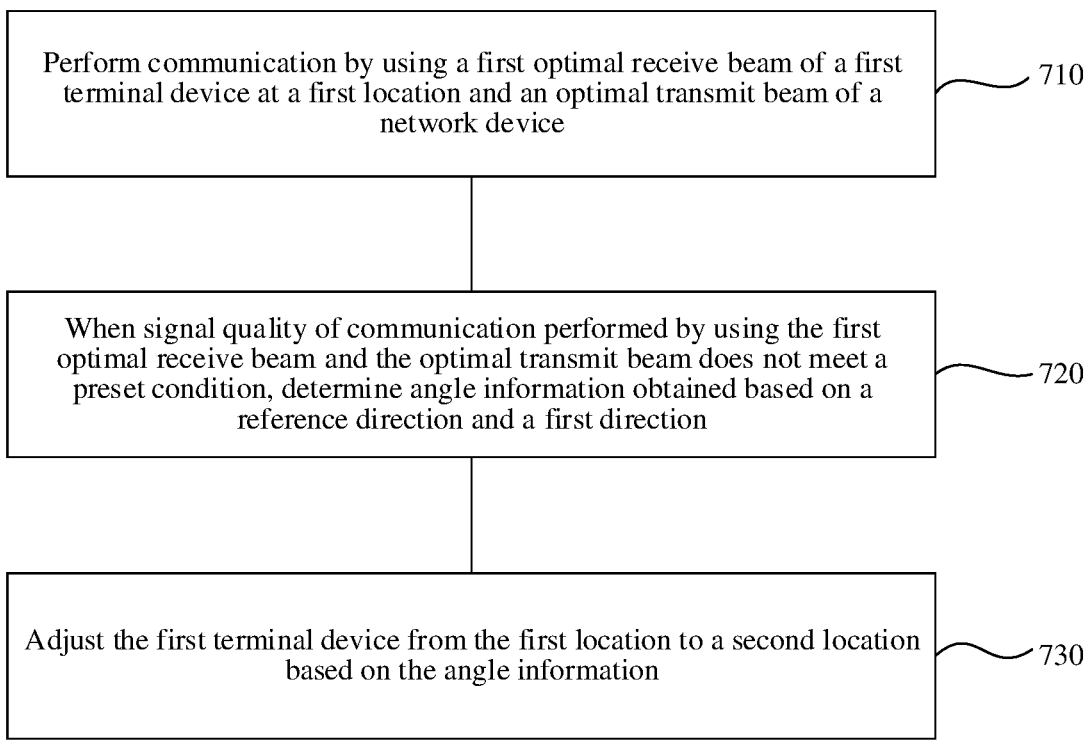
FIG. 15 is another schematic flowchart of a device orientation adjustment method according to an embodiment of this application.

FIG. 15 is a schematic flowchart of a device orientation adjustment method 700 according to an embodiment of this application. Refer to FIG. 15. The method is performed by a first terminal device. The first terminal device may be the terminal device in FIG. 12 or the first terminal device in FIG. 13. The following describes each step.

S710: Perform communication by using a first optimal receive beam of the first terminal device at a first location and an optimal transmit beam of a network device.

For specific descriptions of this step, refer to related descriptions of step S210 in the method 200. Details are not described again.

S720: When signal quality of performing communication by using the first optimal receive beam and the optimal transmit beam does not meet a preset condition, determine angle information obtained based on a reference direction and a first direction, where the reference direction is a direction that is of the first optimal receive beam and that is obtained when the first terminal device is at the first location, the first direction is a direction that is of a target receive beam and that is obtained when the first terminal device is at the first location, signal strength of the target receive beam in free space is greater than signal strength of the first optimal receive beam in free space, and the angle information is used to indicate at least one rotation angle and a rotation direction corresponding to each rotation angle.

Optionally, the preset condition includes: the signal quality is greater than or equal to a threshold. The preset condition may be the second preset condition in the foregoing method 400 or 500.

Optionally, the target receive beam is a primary receive beam, and the primary receive beam is a beam with highest signal strength in free space in a plurality of receive beams of the first terminal device.

Optionally, the determining angle information obtained based on a reference direction and a first direction includes:

determining the angle information based on a beam map of the first terminal device, where the beam map is used to indicate spatial distribution of a plurality of receive beams of the first terminal device.

For specific descriptions of step S620, refer to the related descriptions of step S261 in the method 200. Details are not described again.

S730: Adjust the first terminal device from the first location to a second location based on the angle information, where a second optimal receive beam used by the first terminal device to perform communication with the optimal transmit beam at the second location is the target receive beam.

Optionally, when the first terminal device is at the second location, a direction of the target receive beam and the reference direction overlap, as shown in (a) in FIG. 9. In this way, the signal quality of communication can be further improved.

As an example and not a limitation, the target receive beam may alternatively be another beam whose signal strength is greater than that of the first optimal receive beam, which is not limited in this embodiment of this application. For example, refer to (b) in FIG. 9.

In some embodiments, the terminal device may be connected to a base, and the base is configured to fasten the terminal device, so as to support and fasten the terminal device in an automatic rotation process of the terminal device.

In some other embodiments, a driving apparatus may be further disposed on the base. One end of the driving apparatus is connected to the terminal device, and the other end is connected to the base. The processor may control the driving apparatus to drive the terminal device to automatically rotate to the second position based on a rotation angle in the angle information. For example, the drive apparatus may be a motor.

According to the device orientation adjustment method provided in this embodiment of this application, when the signal quality of communication performed by using the first optimal receive beam and the optimal transmit beam of the network device by the first terminal device at the first location is poor, the direction that is of the target receive beam and that is obtained when the first terminal device is at the first location is determined, the direction that is of the first optimal receive beam and that is obtained when the first terminal device is at the first location is determined, the angle information is obtained based on the two directions, and the first terminal device adjusts the first terminal device to the second location by using the angle information, so that the second optimal receive beam used by the first terminal device to perform communication with the network device at the second location can be used as the target receive beam. In this way, the signal quality of communication can be accurately and effectively improved.

Optionally, before the determining angle information obtained based on a reference direction and a first direction, the method further includes:

detecting an input signal used to request signal quality, and detecting signal quality of communication performed by using the first optimal receive beam and the optimal transmit beam.

In some embodiments, the input signal is generated by an operation performed by a user on a display of the first terminal device.

For specific descriptions of this embodiment, refer to related descriptions of S420 in the method 400. Details are not described again.

In some other embodiments, the method further includes: receiving an input signal transmitted by a second terminal device.

The input signal may be request information that is transmitted by the second terminal device and that is used to request signal quality. For specific descriptions, refer to related descriptions of S520 in the method 500. Details are not described again.

Figure 16:
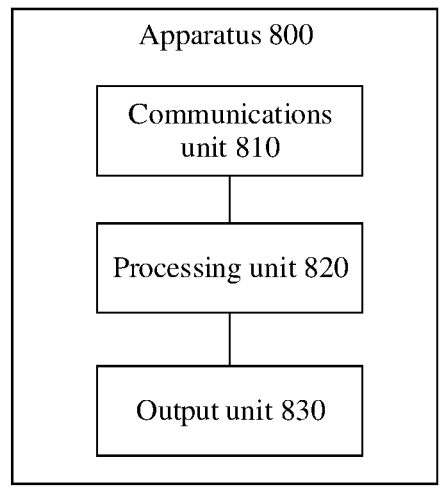
FIG. 16 is a schematic block diagram of a device orientation adjustment apparatus according to an embodiment of this application.

FIG. 16 is a schematic block diagram of a device orientation adjustment apparatus 800 according to an embodiment of this application. Refer to FIG. 16. The apparatus 800 may be disposed in the foregoing first terminal device. Alternatively, the apparatus 800 is the foregoing first terminal device.

The apparatus 800 includes:
a communications unit 810, configured to perform communication by using a first optimal receive beam of the first terminal device at a first location and an optimal transmit beam of a network device;
a processing unit 820, configured to: when signal quality of communication performed by using the first optimal receive beam and the optimal transmit beam does not meet a preset condition, determine angle information obtained based on a reference direction and a first direction, where the reference direction is a direction that is of the first optimal receive beam and that is obtained when the first terminal device is at the first location, the first direction is a direction that is of a target receive beam and that is obtained when the first terminal device is at the first location, signal strength of the target receive beam in free space is greater than signal strength of the first optimal receive beam in free space, and the angle information is used to indicate at least one rotation angle and a rotation direction corresponding to each rotation angle; and an output unit 830, configured to output orientation adjustment indication information based on the angle information, where the orientation adjustment indication information is used to indicate a rotation operation for the first terminal device, so that the first terminal device can be adjusted from the first location to a second location, and a second optimal receive beam used by the first terminal device to perform communication with the optimal transmit beam at the second location is the target receive beam.

Figure 17:
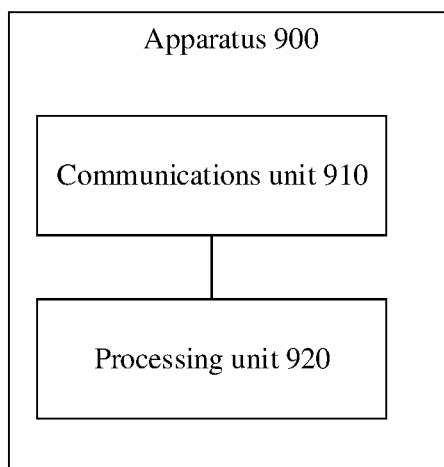
FIG. 17 is another schematic block diagram of a device orientation adjustment apparatus according to an embodiment of this application.

FIG. 17 is a schematic block diagram of a device orientation adjustment apparatus 900 according to an embodiment of this application. Refer to FIG. 17. The apparatus 900 may be disposed in the first terminal device, or the apparatus 900 is the first terminal device.

The apparatus 800 includes:
a communications unit 810, configured to perform communication with an optimal transmit beam of a network device by using a first optimal receive beam of the first terminal device at a first location; and
a processing unit 820, configured to: when signal quality of communication performed by using the first optimal receive beam and the optimal transmit beam does not meet a preset condition, determine angle information obtained based on a reference direction and a first direction, where the reference direction is a direction that is of the first optimal receive beam and that is obtained when the first terminal device is at the first location, the first direction is a direction that is of a target receive beam and that is obtained when the first terminal device is at the first location, signal strength of the target receive beam in free space is greater than signal strength of the first optimal receive beam in free space, and the angle information is used to indicate at least one rotation angle and a rotation direction corresponding to each rotation angle; and
the processing unit 820 is further configured to adjust the first terminal device from the first location to a second location based on the angle information, where a second optimal receive beam used by the first terminal device to perform communication with the optimal transmit beam at the second location is the target receive beam.

Figure 18:
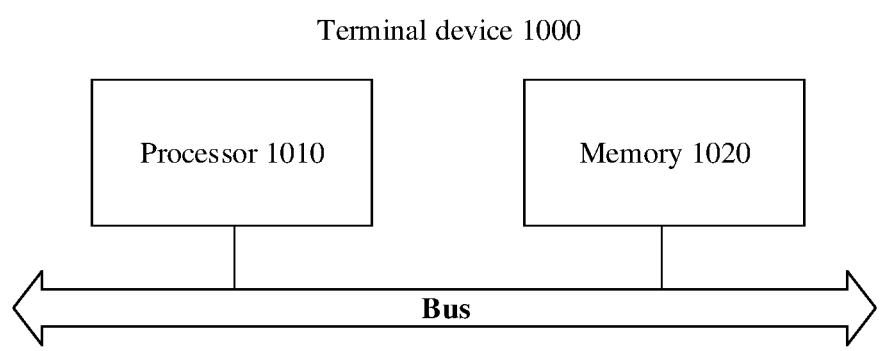
FIG. 18 is a schematic block diagram of a terminal device according to an embodiment of this application.

FIG. 18 is a schematic diagram of a structure of a terminal device 1000 according to an embodiment of this application. As shown in FIG. 18, the terminal device includes one or more processors 1010 and one or more memories 1020. The one or more memories 1020 store one or more computer programs, and the one or more computer programs include instructions. When the instructions are run by the one or more processors 1010, the terminal device is enabled to perform the technical solution in any one of the foregoing embodiments. Implementation principles and technical effects thereof are similar to those of the foregoing method embodiments. Details are not described herein again.

An embodiment of this application provides a computer program product. When the computer program product runs on a first terminal device, the first terminal device is enabled to perform the technical solutions in the foregoing embodiments. Implementation principles and technical effects thereof are similar to those of the foregoing method embodiments. Details are not described herein again.

An embodiment of this application provides a readable storage medium. The readable storage medium includes instructions, and when the instructions are run on a first terminal device, the first terminal device is enabled to perform the technical solution in the foregoing embodiment. Implementation principles and technical effects thereof are similar, and details are not described herein again.

An embodiment of this application provides a chip. The chip is configured to execute instructions. When the chip runs, the technical solutions in the foregoing embodiments are executed. Implementation principles and technical effects thereof are similar, and details are not described herein again.

It should also be understood that "parallel" or "perpendicular" described in this application may be understood as "approximately parallel" or "approximately perpendicular".

It should be noted that the terms "first" and "second" are merely intended for a purpose of description, and shall not be understood as an indication or implication of relative importance or implicit indication of a quantity of indicated technical features. A feature limited by "first" and "second" may explicitly or implicitly include one or more features.

In embodiments of this application, "at least one" means one or more, and "a plurality of" means two or more. "At least some members" means some or all members. The term "and/or" describes an association relationship between associated objects, and indicates that three relationships may exist. For example, A and/or B may indicate the following cases: Only A exists, both A and B exist, and only B exists, where A and B may be singular or plural. A character "/" generally indicates an "or" relationship between the associated objects.

A person of ordinary skill in the art may be aware that, in combination with examples described in embodiments disclosed in this specification, units and algorithm steps may be implemented by electronic hardware or a combination of computer software and electronic hardware. Whether the functions are performed by hardware or software depends on particular applications and design constraints of the technical solution. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the protection scope of this application.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    performing, by a first terminal device, communication by using a first optimal receive beam of the first terminal device at a first location and an optimal transmit beam of a network device;
    when a signal quality of the first optimal receive beam and the optimal transmit beam does not meet a preset condition, determining, by the first terminal device, angle information obtained based on a reference direction and a first direction, wherein the reference direction is a direction of the first optimal receive beam obtained when the first terminal device is at the first location, wherein the first direction is a direction of a target receive beam is obtained when the first terminal device is at the first location, wherein a signal strength of the target receive beam in free space is greater than a signal strength of the first optimal receive beam in the free space, and wherein the angle information is used to indicate at least one rotation angle and a rotation direction corresponding to each rotation angle; and outputting, by the first terminal device, orientation adjustment indication information based on the angle information or adjusting the first terminal device from the first location to a second location based on the angle information, wherein the orientation adjustment indication information is used to indicate a rotation operation for the first terminal device so that the first terminal device is adjustable from the first location to the second location, and wherein a second optimal receive beam used by the first terminal device to perform the communication with the optimal transmit beam at the second location is the target receive beam.

2. The method according to claim 1, wherein outputting the orientation adjustment indication information based on the angle information comprises controlling a display to display a first interface based on the angle information, wherein the first interface comprises the orientation adjustment indication information generated in a graphical manner.

3. The method according to claim 1, wherein outputting the orientation adjustment indication information based on the angle information comprises transmitting the orientation adjustment indication information to a second terminal device based on the angle information.

4. The method according to claim 3, wherein, before determining the angle information obtained based on the reference direction and the first direction, the method further comprises:
receiving request information transmitted by the second terminal device, wherein the request information is used to request signal quality; and
detecting, based on the request information, signal quality of communication performed by using the first optimal receive beam and the optimal transmit beam.

5. The method according to claim 1, wherein determining the angle information obtained based on the reference direction and the first direction comprises determining the angle information based on a beam map of the first terminal device, wherein the beam map is used to indicate spatial distribution of a plurality of receive beams of the first terminal device.

6. The method according to claim 1, wherein the preset condition comprises that the signal quality is greater than or equal to a threshold.

7. The method according to claim 1, wherein the target receive beam is a primary receive beam, and wherein the primary receive beam is a beam with a highest signal strength in free space in a plurality of receive beams of the first terminal device.

8. The method according to claim 1, wherein, when the first terminal device is at the second location, a direction of the target receive beam and the reference direction overlap.

9. The method according to claim 1, wherein before determining the angle information obtained based on the reference direction and the first direction, the method further comprises detecting an input signal used to request the signal quality, and detecting the signal quality of the first optimal receive beam and the optimal transmit beam.

10. The method according to claim 9,
wherein the input signal is generated by an operation performed by a user on a display of the first terminal device, and wherein the input signal is sent by a second terminal device.

11. A first terminal device comprising:
a memory; and
a processor configured to execute a computer program stored in the memory, the computer program comprising instructions for:
performing communication by using a first optimal receive beam of the first terminal device at a first location and an optimal transmit beam of a network device;
when a signal quality of the first optimal receive beam and the optimal transmit beam does not meet a preset condition, determining angle information obtained based on a reference direction and a first direction, wherein the reference direction is a direction of the first optimal receive beam obtained when the first terminal device is at the first location, wherein the first direction is a direction of a target receive beam obtained when the first terminal device is at the first location, wherein a signal strength of the target receive beam in free space is greater than signal strength of the first optimal receive beam in the free space, and wherein the angle information is used to indicate at least one rotation angle and a rotation direction corresponding to each rotation angle; and
outputting orientation adjustment indication information based on the angle information or adjusting the first terminal device from the first location to a second location based on the angle information, wherein the orientation adjustment indication information is used to indicate a rotation operation for the first terminal device so that the first terminal device is adjustable from the first location to the second location, and wherein a second optimal receive beam used by the first terminal device to perform the communication with the optimal transmit beam at the second location is the target receive beam.

12. The first terminal device according to claim 11, wherein the instructions for outputting the orientation adjustment indication information based on the angle information comprise instructions for controlling a display to display a first interface based on the angle information, wherein the first interface comprises the orientation adjustment indication information generated in a graphical manner.

13. The first terminal device according to claim 11, wherein the instructions for outputting the orientation adjustment indication information based on the angle information comprise instructions for transmitting the orientation adjustment indication information to a second terminal device based on the angle information.

14. The first terminal device according to claim 13, wherein the computer program comprises further instructions, before the instructions for determining the angle information obtained based on the reference direction and the first direction, for:
receiving request information transmitted by the second terminal device, wherein the request information is used to request signal quality; and
detecting, based on the request information, signal quality of communication performed by using the first optimal receive beam and the optimal transmit beam.

15. The first terminal device according to claim 11, wherein the instructions for determining the angle information obtained based on the reference direction and the first direction comprise instructions for determining the angle information based on a beam map of the first terminal device, wherein the beam map is used to indicate spatial distribution of a plurality of receive beams of the first terminal device.

16. The first terminal device according to claim 11, wherein the preset condition comprises that the signal quality is greater than or equal to a threshold.

17. The first terminal device according to claim 11, wherein the target receive beam is a primary receive beam, and wherein the primary receive beam is a beam with a highest signal strength in free space in a plurality of receive beams of the first terminal device.

18. The first terminal device according to claim 11, wherein, when the first terminal device is at the second location, a direction of the target receive beam and the reference direction overlap.

19. The first terminal device according to claim 11, wherein the computer program comprises further instructions, before the instructions for determining the angle information obtained based on the reference direction and the first direction, for detecting an input signal used to request the signal quality, and detecting the signal quality of the first optimal receive beam and the optimal transmit beam.

20. The first terminal device according to claim 19,
wherein the input signal is generated by an operation performable by a user on a display of the first terminal device or
wherein the input signal is received from a second terminal device.

* * * * *

UNITED STATES PATENT AND TRADEMARK OFFICE
CERTIFICATE OF CORRECTION

PATENT NO. : 12,184,381 B2  
APPLICATION NO. : 18/034574  
DATED : December 31, 2024  
INVENTOR(S) : Shaobo Hui Page 1 of 1

It is certified that error appears in the above-identified patent and that said Letters Patent is hereby corrected as shown below:

On the Title Page

Item (87), in Column 1, in "PCT Pub. No.", Line 1, delete "WO2022/089272" and insert -- WO2022/089279 --.

In the Claims

In Column 42, in Claim 1, Line 65, after "beam" delete "is".

Signed and Sealed this  
First Day of April, 2025

Coke Morgan Stewart  
*Acting Director of the United States Patent and Trademark Office*